US012617957B2

(12) United States Patent
Manning et al.

(10) Patent No.: US 12,617,957 B2
(45) Date of Patent: *May 5, 2026

(54) DURABLE OUTDOOR INKJET INKS

(71) Applicant: International Imaging Materials, Inc., Amherst, NY (US)

(72) Inventors: Kathryn A. Manning, Kenmore, NY (US); Daniel Jude Harrison, Pittsford, NY (US)

(73) Assignee: International Imaging Materials, Inc., Amherst, NY (US)

( * ) Notice: Subject to any disclaimer, the term of this patent is extended or adjusted under 35 U.S.C. 154(b) by 1045 days.

This patent is subject to a terminal disclaimer.

(21) Appl. No.: 17/307,302

(22) Filed: May 4, 2021

(65) Prior Publication Data

US 2021/0324211 A1 Oct. 21, 2021

Related U.S. Application Data

(63) Continuation of application No. PCT/US2019/061898, filed on Nov. 17, 2019.

(60) Provisional application No. 62/768,883, filed on Nov. 17, 2018.

(51) Int. Cl.
| | |
|---|---|
| *C09D 11/107* | (2014.01) |
| *B41J 11/00* | (2006.01) |
| *C08K 5/00* | (2006.01) |
| *C08K 5/19* | (2006.01) |
| *C08L 25/14* | (2006.01) |
| *C09D 11/033* | (2014.01) |
| *C09D 11/037* | (2014.01) |
| *C09D 11/106* | (2014.01) |
| *C09D 11/322* | (2014.01) |
| *C09D 11/326* | (2014.01) |
| *C09D 11/38* | (2014.01) |

(52) U.S. Cl.
CPC ........... *C09D 11/107* (2013.01); *B41J 11/002* (2013.01); *C08K 5/0025* (2013.01); *C08K 5/0041* (2013.01); *C08K 5/0058* (2013.01); *C08K 5/19* (2013.01); *C08L 25/14* (2013.01); *C09D 11/033* (2013.01); *C09D 11/037* (2013.01); *C09D 11/106* (2013.01); *C09D 11/322* (2013.01); *C09D 11/38* (2013.01); *C08K 2201/005* (2013.01); *C09D 11/326* (2013.01)

(58) Field of Classification Search
CPC ............ C09D 11/30–40; C09D 11/107; C09D 133/02; C08L 33/02
See application file for complete search history.

(56) References Cited

U.S. PATENT DOCUMENTS

| | | | |
|---|---|---|---|
| 3,846,141 A | 11/1974 | Ostergren et al. | |
| 4,285,690 A | 8/1981 | North | |
| 4,694,302 A | 9/1987 | Hackleman et al. | |
| 5,062,892 A | 11/1991 | Halko | |
| 5,112,399 A | 5/1992 | Slevin et al. | |
| 5,133,803 A | 7/1992 | Moffatt | |
| 5,141,556 A | 8/1992 | Matrick | |
| 5,172,133 A | 12/1992 | Suga et al. | |
| 5,188,664 A | 2/1993 | Adamic et al. | |
| 5,213,613 A | 5/1993 | Nagashima et al. | |
| 5,221,334 A | 6/1993 | Ma et al. | |
| 5,284,894 A | 2/1994 | Wasyliw et al. | |
| 5,316,575 A * | 5/1994 | Lent .................... | C09D 11/322 |
| | | | 347/100 |
| 5,700,317 A | 12/1997 | Adamic | |
| 5,852,075 A | 12/1998 | Held | |
| 5,990,202 A | 11/1999 | Nguyen et al. | |
| 6,019,828 A | 2/2000 | Rehman | |
| 6,020,397 A | 2/2000 | Matzinger | |
| 6,177,498 B1 | 1/2001 | Rehman | |
| 6,341,586 B2 | 1/2002 | Thompson et al. | |
| 6,341,856 B1 | 1/2002 | Thompson et al. | |

(Continued)

FOREIGN PATENT DOCUMENTS

| | | | |
|---|---|---|---|
| EP | 0068903 B1 | | 5/1985 |
| EP | 425150 A * | | 5/1991 |

(Continued)

OTHER PUBLICATIONS

Momentive CoatOSil 1220 Marketing Bulletin.*

(Continued)

*Primary Examiner* — Kregg T Brooks

(74) *Attorney, Agent, or Firm* — Michael J. Nickerson

(57) ABSTRACT

An inkjet ink for printing durable outdoor images with an inkjet printer includes an basic pH aqueous ink vehicle comprising water, a soluble base, and at least one water soluble organic solvent; a pigment dispersion; and a polymer comprising base neutralized carboxylic acid groups with a glass transition temperature between 0 and 150° C. and an acid number between 50 and 1000 mg KOH/g dissolved in the vehicle, wherein the carboxylic acid groups are base neutralized; a poly-electrophilic functionalized compound capable of crosslinking the neutralized carboxylic acidic groups on the polymer wherein the ratio of the poly-electrophilic groups on the functionalized compound to carboxylic acid groups on the polymer is 1:1 or less on an equivalent basis and the ink maintains a stable viscosity and pigment particle size distribution for 6 weeks at 60° C.; the water in the ink inhibiting the crosslinking reaction until after the ink is printed and the water is substantially removed from the ink by drying.

25 Claims, 20 Drawing Sheets

(56)                References Cited

U.S. PATENT DOCUMENTS

| | | | |
|---|---|---|---|
| 6,417,249 | B1 | 7/2002 | Nguyen et al. |
| 6,436,180 | B1 | 8/2002 | Ma et al. |
| 6,444,017 | B1 | 9/2002 | Yue et al. |
| 6,498,202 | B1 | 12/2002 | Sun et al. |
| 6,610,129 | B1 | 8/2003 | Sader et al. |
| 6,639,006 | B1 | 10/2003 | Cottrell et al. |
| 7,030,175 | B2 | 4/2006 | Vincent et al. |
| 7,371,273 | B2 | 5/2008 | Vincent et al. |
| 7,838,574 | B2 | 11/2010 | Ma et al. |
| 8,052,269 | B2 | 11/2011 | Vasudevan |
| 8,114,923 | B2 | 2/2012 | Sarkisian et al. |
| 8,198,391 | B2 | 6/2012 | Itoya et al. |
| 8,267,505 | B2 | 9/2012 | Jolly et al. |
| 8,268,910 | B2 | 9/2012 | Gardner et al. |
| 8,287,112 | B2 | 10/2012 | Van Thillo et al. |
| 8,314,163 | B2 | 11/2012 | Ganapathiappan |
| 8,474,963 | B2 | 7/2013 | Hasegawa et al. |
| 8,487,036 | B2 | 7/2013 | Ganapathiappan |
| 8,573,761 | B2 | 11/2013 | Vasudevan et al. |
| 8,939,568 | B2 | 1/2015 | Stoeva et al. |
| 9,487,666 | B2 | 11/2016 | Tamai et al. |
| 9,587,130 | B2 | 3/2017 | Tyrell et al. |
| 9,611,401 | B2 | 4/2017 | Mozel et al. |
| 9,771,488 | B2 | 9/2017 | Hong et al. |
| 9,783,692 | B2 | 10/2017 | Cagle et al. |
| 10,005,876 | B2 | 6/2018 | Chen et al. |
| 10,072,166 | B2 | 9/2018 | Ganapathiappan et al. |
| 2001/0032566 | A1* | 10/2001 | Yatake ................... C09D 11/38 106/31.89 |
| 2007/0259989 | A1 | 11/2007 | Berge et al. |
| 2008/0045636 | A1* | 2/2008 | Iyama ................. C08K 5/0075 524/154 |
| 2011/0101083 | A1* | 5/2011 | Matsuzaki ........... C09D 11/102 428/206 |
| 2011/0159768 | A1* | 6/2011 | Crescimanno .......... C08J 5/045 524/73 |
| 2014/0139595 | A1 | 5/2014 | Hong et al. |
| 2018/0118963 | A1 | 5/2018 | Xu et al. |

FOREIGN PATENT DOCUMENTS

| | | | |
|---|---|---|---|
| EP | 2341110 | A1 | 7/2011 |
| EP | 1853431 | B1 | 8/2012 |
| JP | 2516218 | B2 | 12/1988 |
| JP | 2867491 | | 7/1991 |
| JP | H066684 | B2 | 1/1994 |
| JP | 2002121447 | A1 | 4/2002 |
| JP | 2000109733 | | 8/2016 |
| WO | WO1999023182 | | 5/1999 |
| WO | WO2006049982 | | 5/2006 |

OTHER PUBLICATIONS

Solvay Aerosol Surfactants Specialty Additives.*

Scifinder Properties of CAS 110-91-8 (Year: 2024).*

Database Registry [Online]; Chemical Abstracts Service, Columbus, Ohio, US; Nov. 16, 1984 (Nov. 16, 1984), "64265-57-2",XP002797983, Database accession No. 64265-57-2. Nov. 16, 1984.

Unknown: "Technical Data Sheet EPI-REZ(TM) Resin 3515-W-60", Dec. 31, 2007 (Dec. 31, 2007), XP055672327, Retrieved from the Internet: URL:https://www.hexion.com/ CustomServices/ PDFDownloader.aspx?type=tds&pid=196d253c-5814-6fe3-ae8a-ff0300fcd525[retrieved on Feb. 28, 2020] Feb. 28, 2020.

Unknown: "Joncryl 60", Aug. 1, 2016 (Aug. 1, 2016), XP055672331, Retrieved from the Internet: URL:https://dispersions-resins-products.basf.us/files/technical-datasheets/Joncryl_60_August_2016_R3_PP.pdf [retrieved on Feb. 28, 2020] Feb. 28, 2020.

International Search Report for PCT Application PCT/US2019/061898 Mar. 16, 2020.

* cited by examiner

TABLE 1

| composition of ink | | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| | | | | | | | Example Inks (Vehicle 1) | | | | | | | | |
| pigment dispersion | Kodak Specialty Black A1 | 12.00 | 12.00 | 12.00 | 12.00 | 12.00 | 12.00 | 12.00 | 12.00 | 12.00 | 12.00 | 12.00 | 12.00 | 12.00 | 12.00 |
| Resin | Joncryl 683 (KOH) 20% Sol. | 10.00 | 10.00 | 10.00 | 10.00 | 10.00 | 10.00 | 10.00 | 10.00 | 10.00 | 10.00 | 10.00 | 10.00 | 10.00 | 10.00 |
| humectant | Glycerol | 6.00 | 6.00 | 6.00 | 6.00 | 6.00 | 6.00 | 6.00 | 6.00 | 6.00 | 6.00 | 6.00 | 6.00 | 6.00 | 6.00 |
| | 2-Pyrrolidone | 12.00 | 12.00 | 12.00 | 12.00 | 12.00 | 12.00 | 12.00 | 12.00 | 12.00 | 12.00 | 12.00 | 12.00 | 12.00 | 12.00 |
| surfactant | Surfynol 440 | 0.30 | 0.30 | 0.30 | 0.30 | 0.30 | 0.30 | 0.30 | 0.30 | 0.30 | 0.30 | 0.30 | 0.30 | 0.30 | 0.30 |
| surfactant | Capstone FS-31 | 0.30 | 0.30 | 0.30 | 0.30 | 0.30 | 0.30 | 0.30 | 0.30 | 0.30 | 0.30 | 0.30 | 0.30 | 0.30 | 0.30 |
| Biocide | Proxel GXL | 0.20 | 0.20 | 0.20 | 0.20 | 0.20 | 0.20 | 0.20 | 0.20 | 0.20 | 0.20 | 0.20 | 0.20 | 0.20 | 0.20 |
| Crosslinker | Primid XL-552 | 2.27 | | | | | | | | | | | | | |
| | Epocros WS-700 | | 3.03 | | | | | | | | | | | | |
| | Cymel 303 LF | | | | 0.57 | | | | | | | | | | |
| | Carbodilite V-02-L2 | | | | | 3.31 | | | | | | | | | |
| | Carbodilite V-04 | | | | | | 2.88 | | | | | | | | |
| | Denacol EX-321 | | | | | | | 0.48 | | | | | | | |
| | Adipic Dihydrazide | | | | | | | | 0.60 | | | | | | |
| | Crosslinker CX-100 | | | | | | | | | 0.57 | | | | | |
| | EMTech CL-100 | | | | | | | | | | 1.10 | | | | |
| | Ammonium Zirconium (IV) Carbonate sol. | | | | | | | | | | | 0.17 | | | |
| | Tyzor LA | | | | | | | | | | | | 0.05 | | |
| | Zoldine XL-29SE | | | | | | | | | | | | | 2.82 | |
| | Flexipal MKO-20 | | | | | | | | | | | | | | 2.00 |
| Water | RODI water | 59.20 | 56.93 | 56.17 | 58.63 | 55.89 | 56.32 | 58.72 | 58.60 | 58.63 | 58.10 | 59.03 | 59.14 | 56.38 | 57.20 |

FIGURE 1

TABLE 2

| composition of ink | | 15 | 16 | 17 | 18 | 19 | 20 | 21 | 22 | 23 | 24 | 25 | 26 | 27 | 28 |
|---|---|---|---|---|---|---|---|---|---|---|---|---|---|---|---|
| Pigment dispersion | Kodak Specialty Black A1 | 12.00 | 12.00 | 12.00 | 12.00 | 12.00 | 12.00 | 12.00 | 12.00 | 12.00 | 12.00 | 12.00 | 12.00 | 12.00 | 12.00 |
| Resin | Joncryl 683 (KOH) 20% sol. | 10.00 | 10.00 | 10.00 | 10.00 | 10.00 | 10.00 | 10.00 | 10.00 | 10.00 | 10.00 | 10.00 | 10.00 | 10.00 | 10.00 |
| Humectant | Glycerol | | | | | | | | | | | | | | |
| | 2-Pyrrolidone | 6.00 | 6.00 | 6.00 | 6.00 | 6.00 | 6.00 | 6.00 | 6.00 | 6.00 | 6.00 | 6.00 | 6.00 | 6.00 | 6.00 |
| | ethylene glycol | 12.00 | 12.00 | 12.00 | 12.00 | 12.00 | 12.00 | 12.00 | 12.00 | 12.00 | 12.00 | 12.00 | 12.00 | 12.00 | 12.00 |
| Surfactant | Surfynol 440 | 0.30 | 0.30 | 0.30 | 0.30 | 0.30 | 0.30 | 0.30 | 0.30 | 0.30 | 0.30 | 0.30 | 0.30 | 0.30 | 0.30 |
| | Capstone FS-31 | 0.30 | 0.30 | 0.30 | 0.30 | 0.30 | 0.30 | 0.30 | 0.30 | 0.30 | 0.30 | 0.30 | 0.30 | 0.30 | 0.30 |
| Biocide | Proxel GXL | 0.20 | 0.20 | 0.20 | 0.20 | 0.20 | 0.20 | 0.20 | 0.20 | 0.20 | 0.20 | 0.20 | 0.20 | 0.20 | 0.20 |
| Crosslinker | Primid XL-552 | | 2.27 | | | | | | | | | | | | |
| | Epocros WS-700 | | | 3.03 | | | | | | | | | | | |
| | Cymel 303 LF | | | | 0.57 | | | | | | | | | | |
| | Carbodolite V-02-L2 | | | | | 3.31 | | | | | | | | | |
| | Carbodolite V-04 | | | | | | 2.88 | | | | | | | | |
| | Denacol EX-321 | | | | | | | 0.48 | | | | | | | |
| | Adipic Dihydrazide | | | | | | | | 0.60 | | | | | | |
| | Crosslinker CX-100 | | | | | | | | | 0.57 | | | | | |
| | EMTech CL-100 | | | | | | | | | | 1.10 | | | | |
| | Ammonium Zirconium (IV) Carbonate sol. | | | | | | | | | | | 0.17 | | | |
| | Tyzor LA | | | | | | | | | | | | 0.06 | | |
| | Zoldine XL-29SE | | | | | | | | | | | | | 2.82 | |
| | Flexipol MKQ-20 | | | | | | | | | | | | | | 2.00 |
| Water | RODI water | 59.20 | 56.93 | 56.17 | 58.63 | 55.89 | 56.32 | 58.72 | 58.60 | 58.63 | 58.10 | 59.03 | 59.14 | 56.38 | 57.20 |

Example inks (Vehicle 2)

FIGURE 2

TABLE 3

| Ink | Vehicle | % Tertiary amine added to example ink | Epocros WS-700 | dry rub rating vs. cure time at 60°C | | | | |
|---|---|---|---|---|---|---|---|---|
| | | | | 24hr | 48hr | 72hr | 96hr | |
| Comp. Example Ink 1 | 1 | 0 | 0% | ✕ | ✕ | ✕ | ✕ | |
| Example Ink 3 | 1 | 0 | 3.03% | ✕ | ◯ | ◻ | ◼ | |
| Example Ink 3 | 1 | 0.5% TEA | 3.03% | ✕ | ✕ | ◯ | ◯ | |
| Example Ink 3 | 1 | 2% TEA | 3.03% | ✕ | ✕ | ✕ | ◯ | |
| Comp. Example Ink 15 | 2 | 0 | 0% | ✕ | ✕ | ✕ | ✕ | |
| Example Ink 17 | 2 | 0 | 3.03% | ✕ | ◻ | ◼ | ◼ | |
| Example Ink 17 | 2 | 1% TEA | 3.03% | ✕ | ▦ | ◻ | ◻ | |
| Example Ink 17 | 2 | 1% Triethylamine | 3.03% | ✕ | ▦ | ◻ | ◻ | |

LEGEND

Durability Rating Scale

| | ✕ | ◯ | ▦ | ◻ | ◼ |
|---|---|---|---|---|---|
| | poor | fair | good | very good | excellent |
| | 2 to 0 | 4 to 2 | 6 to 4 | 8 to 6 | 10 to 8 |

FIGURE 3

TABLE 4

| Ink | Vehicle | % Tertiary amine added to example ink | Cymel 303 LF | dry rub rating vs. cure time at 60°C | | | |
|---|---|---|---|---|---|---|---|
| | | | | 24hr | 48hr | 72hr | 96hr |
| Comp. Example Ink 1 | 1 | 0 | 0% | ✕ | ✕ | ✕ | ✕ |
| Example Ink 4 | 1 | 0 | 0.57% | ✕ | ◍ | ◍ | ◍ |
| Example Ink 4 | 1 | 0.5% TEA | 0.57% | ✕ | ○ | ○ | ○ |
| Example ink 4 | 1 | 2% TEA | 0.57% | ✕ | ✕ | ✕ | ✕ |
| Comp. Example Ink 15 | 2 | 0 | 0% | ✕ | ✕ | ✕ | ✕ |
| Example ink 18 | 2 | 0 | 0.57% | ✕ | ○ | ◍ | ◍ |
| Example ink 18 | 2 | 1% TEA | 0.57% | ✕ | ✕ | ○ | ○ |
| Example ink 18 | 2 | 1% Triethylamine | 0.57% | ✕ | ✕ | ○ | ○ |

LEGEND

| Durability Rating Scale | | | | |
|---|---|---|---|---|
| ✕ | ○ | ◍ | ◻ | ■ |
| poor | fair | good | very good | excellent |
| 2 to 0 | 4 to 2 | 6 to 4 | 8 to 6 | 10 to 8 |

FIGURE 4

TABLE 5

| ink | Vehicle added to example ink | % Tertiary amine | Carbodolite V-04 | dry rub rating vs. cure time at 60°C | | | |
|---|---|---|---|---|---|---|---|
| | | | | 24hr | 48hr | 72hr | 96hr |
| Comp. Example Ink 1 | 1 | 0 | 0% | x | x | x | x |
| Example Ink 6 | 1 | 0 | 2.98% | O | O | □ | ■ |
| Example Ink 6 | 1 | 0.5% TEA | 2.88% | x | x | □ | ■ |
| Example Ink 6 | 1 | 2% TEA | 2.98% | x | x | good | ■ |
| Comp. Example Ink 15 | 2 | 0 | 0% | x | x | x | x |
| Example Ink 20 | 2 | 0 | 2.88% | x | good | ■ | ■ |
| Example Ink 20 | 2 | 1% TEA | 2.88% | x | O | ■ | ■ |
| Example Ink 20 | 2 | 1% Triethylamine | 2.88% | x | O | □ | □ |

LEGEND

Durability Rating Scale

| x | ◇ | ◈ | □ | ■ |
|---|---|---|---|---|
| poor | fair | good | very good | excellent |
| 2 to 0 | 4 to 2 | 6 to 4 | 8 to 6 | 10 to 8 |

FIGURE 5

TABLE 6

| Example Ink | Crosslinker | Substrate | cure temp. (°C) | cure time (Hr.) | dry rub rating after 72 hrs/60°C | | |
|---|---|---|---|---|---|---|---|
| | | | | | no tertiary amine | 1% TEA | 1% triethyl-amine |
| 1 | None | glossy vinyl | 60 | 72 | ※ | ※ | ※ |
| 2 | Primid XL-552 | glossy vinyl | 60 | 72 | ■ | ■ | ■ |
| 3 | Epocros WS-700 | glossy vinyl | 60 | 72 | ■ | □ | □ |
| 4 | Cymel 303 LF | glossy vinyl | 60 | 72 | ◉ | ◎ | ◎ |
| 5 | Carbodilite V-02-L2 | glossy vinyl | 60 | 72 | ■ | ■ | ■ |
| 6 | Carbodilite V-04 | glossy vinyl | 60 | 72 | ■ | ◎ | □ |
| 7 | Denacol EX-321 | glossy vinyl | 60 | 72 | ◎ | ◎ | ◎ |
| 8 | Adipic Dihydrazide | glossy vinyl | 60 | 72 | ◎ | ◎ | ◎ |
| 9 | Crosslinker CX-100 | glossy vinyl | 60 | 72 | ■ | □ | ◎ |
| 10 | EMTech CL-100 | glossy vinyl | 60 | 72 | ■ | ■ | ■ |
| 11 | Ammonium Zirconium (IV) Carbonate sol. | glossy vinyl | 60 | 72 | ■ | ■ | ■ |

LEGEND

Durability Rating Scale

| | ※ | ◎ | ◉ | □ | ■ |
|---|---|---|---|---|---|
| | poor | fair | good | very good | excellent |
| | 2 to 0 | 4 to 2 | 6 to 4 | 8 to 6 | 10 to 8 |

FIGURE 6

TABLE 7

| Example ink | Crosslinker | Substrate | cure temp. (°C) | cure time (Hr.) | water rub rating after 72 hrs/60°C | | |
|---|---|---|---|---|---|---|---|
| | | | | | 0% TA | 1% TEA | 1% Triethylamine |
| 1 | None | Adhesive Vinyl | 60 | 72 | × | × | × |
| 2 | Primid XL-552 | Adhesive Vinyl | 60 | 72 | ■ | ■ | ■ |
| 3 | Epocros WS-700 | Adhesive Vinyl | 60 | 72 | ■ | ◉ | ◉ |
| 4 | Cymel 303 LF | Adhesive Vinyl | 60 | 72 | ■ | □ | □ |
| 5 | Carbodolite V-02-L2 | Adhesive Vinyl | 60 | 72 | ◇ | ◉ | ◇ |
| 6 | Carbodolite V-04 | Adhesive Vinyl | 60 | 72 | ■ | ■ | ■ |
| 7 | Denacol EX-321 | Adhesive Vinyl | 60 | 72 | □ | □ | ■ |
| 8 | Adipic Dihydrazide | Adhesive Vinyl | 60 | 72 | □ | ◉ | ◇ |
| 9 | Crosslinker CX-100 | Adhesive Vinyl | 60 | 72 | ■ | ■ | □ |
| 10 | EMTech CL-100 | Adhesive Vinyl | 60 | 72 | ■ | ■ | □ |
| 11 | Ammonium Zirconium (IV) Carbonate sol. | Adhesive Vinyl | 60 | 72 | ■ | ◉ | ■ |

LEGEND

| Durability Rating Scale | | | | |
|---|---|---|---|---|
| × | ◇ | ◉ | □ | ■ |
| poor | fair | good | very good | excellent |
| 2 to 0 | 4 to 2 | 6 to 4 | 8 to 6 | 10 to 8 |

FIGURE 7

TABLE 8

| Example Ink | Crosslinker | Substrate | cure temp. (°C) | cure time (Hr.) | window cleaner rub rating after 72 hrs/60°C | | |
|---|---|---|---|---|---|---|---|
| | | | | | 0% TA | 1% TEA | 1% Triethylamine |
| 1 | None | Adhesive Vinyl | 60 | 72 | × | × | × |
| 2 | Primid XL-552 | Adhesive Vinyl | 60 | 72 | ■ | ○ | × |
| 3 | Epocros WS-700 | Adhesive Vinyl | 60 | 72 | ◉ | ○ | ○ |
| 4 | Cymel 303 LF | Adhesive Vinyl | 60 | 72 | ■ | ■ | ■ |
| 5 | Carbodilite V-02-L2 | Adhesive Vinyl | 60 | 72 | ○ | ■ | ■ |
| 6 | Carbodilite V-04 | Adhesive Vinyl | 60 | 72 | ■ | ■ | × |
| 7 | Denacol EX-321 | Adhesive Vinyl | 60 | 72 | ○ | ■ | ■ |
| 8 | Adipic Dihydrazide | Adhesive Vinyl | 60 | 72 | ◉ | ◉ | ◉ |
| 9 | Crosslinker CX-100 | Adhesive Vinyl | 60 | 72 | ■ | ■ | ■ |
| 10 | EMTech CL-100 | Adhesive Vinyl | 60 | 72 | ■ | □ | ○ |
| 11 | Ammonium Zirconium (IV) Carbonate sol. | Adhesive Vinyl | 60 | 72 | ■ | □ | ■ |

LEGEND

| Durability Rating Scale | | | | |
|---|---|---|---|---|
| × | ○ | ◉ | □ | ■ |
| poor | fair | good | very good | excellent |
| 2 to 0 | 4 to 2 | 6 to 4 | 8 to 6 | 10 to 8 |

FIGURE 8

TABLE 9

| Example Ink | Crosslinker | Substrate | cure temp (°C) | cure time (Hr.) | Isopropanol rub rating after 72 hrs/60°C | | | |
|---|---|---|---|---|---|---|---|---|
| | | | | | no tertiary amine | 1% triethanol amine | 1% triethanol amine | 1% triethyl amine |
| 1 | None | glossy vinyl | 60 | 72 | × | × | | × |
| 2 | Primid XL-552 | glossy vinyl | 60 | 72 | □ | □ | □ | □ |
| 3 | Epocros WS-700 | glossy vinyl | 60 | 72 | ◍ | ○ | ○ | ○ |
| 4 | Cymel 303 LF | glossy vinyl | 60 | 72 | □ | ◍ | ◍ | ◍ |
| 5 | Carbodolite V-02-L2 | glossy vinyl | 60 | 72 | ○ | ○ | ○ | ○ |
| 6 | Carbodolite V-04 | glossy vinyl | 60 | 72 | ◍ | ○ | ○ | ◍ |
| 7 | Denacol EX-321 | glossy vinyl | 60 | 72 | ○ | ○ | ◍ | ○ |
| 8 | Adipic Dihydrazide | glossy vinyl | 60 | 72 | ■ | ○ | ○ | ○ |
| 9 | Crosslinker CX-100 | glossy vinyl | 60 | 72 | ■ | ■ | □ | □ |
| 10 | EMTech CL-100 | glossy vinyl | 60 | 72 | ○ | □ | ◍ | ◍ |
| 11 | Ammonium Zirconium (IV) Carbonate sol. | glossy vinyl | 60 | 72 | ○ | × | | ○ |

LEGEND

| Durability Rating Scale | | | | |
|---|---|---|---|---|
| × | ○ | ◍ | □ | ■ |
| poor | fair | good | very good | excellent |
| 2 to 0 | 4 to 2 | 6 to 4 | 8 to 6 | 10 to 8 |

FIGURE 9

TABLE 10

| Example Ink | Crosslinker | Ink Keeping Stability: Change in Viscosity (cP) after 8 Weeks at 60°C | | |
| --- | --- | --- | --- | --- |
| | | 0% TEA | 0.5% TEA | 2% TEA |
| 1 | None | 0.01 | 0.00 | -0.01 |
| 2 | Primid XL-552 | 0.04 | 0.04 | 0.07 |
| 3 | Epocros WS-700 | -0.01 | -0.02 | -0.07 |
| 4 | Cymel 303 LF | 0.03 | 0.17 | 0.35 |
| 5 | Carbodilite V-02-L2 | 0.03 | 0.13 | 0.34 |
| 6 | Carbodilite V-04 | Gelled | Gelled | Gelled |
| 7 | Denacol EX-321 | -0.03 | -0.09 | -0.02 |
| 8 | Adipic Dihydrazide | 0.01 | 0.12 | 0.18 |
| 9 | Crosslinker CX-100 | 0.02 | 0.12 | 0.24 |
| 10 | EMFech CL-100 | 0.02 | 0.02 | 0.05 |
| 11 | Ammonium Zirconium (IV) Carbonate sol. | 0.11 | -0.27 | -0.40 |
| 12 | Tyzor LA | 0.14 | 0.13 | 0.14 |
| 13 | Zoldine XL-29SE | Gelled | Gelled | Gelled |
| 14 | Flexipol MKO-20 | Gelled | Gelled | Gelled |

FIGURE 10

TABLE 11

| Example Ink | Crosslinker | Ink Keeping Stability: Change in Pigment Particle Size (nm) after 8 Weeks/60°C | | |
| --- | --- | --- | --- | --- |
| | | 0% TEA | 0.5% TEA | 2% TEA |
| 1 | None | 1 | -1 | 1 |
| 2 | Primid XL-552 | 5 | 2 | 8 |
| 3 | Epocros WS-700 | 3 | 2 | 1 |
| 4 | Cymel 303 LF | 8 | 21 | 66 |
| 5 | Carbodolite V-02-L2 | 2 | 1 | 6 |
| 6 | Carbodolite V-04 | Gelled | Gelled | Gelled |
| 7 | Denacol EX-321 | 5 | -3 | 0 |
| 8 | Adipic Dihydrazide | 9 | 1 | 6 |
| 9 | Crosslinker CX-100 | 27 | 55 | 47 |
| 10 | EM Tech CL-100 | 6 | 1 | 3 |
| 11 | Ammonium Zirconium (IV) Carbonate sol. | 5928 | 2926 | 2925 |
| 12 | Tyzor LA | 2100 | 2529 | 3028 |
| 13 | Zoldine XL-29SE | Gelled | Gelled | Gelled |
| 14 | Flexipol MKO-20 | Gelled | Gelled | Gelled |

FIGURE 11

TABLE 12

Example Ink 11 - Ammonium Zirconium (IV) Carbonate

| Time (min) | 0% TEA Rel. % | 0% TEA size (µm) | 2% TEA Rel. % | 2% TEA size (µm) |
|---|---|---|---|---|
| 0 | 55% | 6.2 | 19% | 3.0 |
| 1 | 25% | 3.4 | 4.9% | 1.4 |
| 2 | 19% | 3.3 | 3.0% | 1.3 |
| 3 | 4.7% | 1.6 | 2.6% | 1.3 |
| 4 | 4.0% | 1.6 | 1.4% | 1.2 |
| 5 | 3.1% | 1.6 | 0.9% | 1.2 |
| 6 | 3.0% | 1.5 | 0.8% | 1.2 |
| 7 | 2.4% | 1.5 | 0.5% | 1.1 |
| 8 | 1.8% | 1.5 | 0.3% | 1.1 |
| 9 | 1.5% | 1.5 | 0.1% | 1.1 |
| 10 | 1.1% | 1.5 | 0% | - |
| 11 | 1.0% | 1.5 | | |
| 12 | 0% | - | | |

Example Ink 12 - Tyzor LA

| Time (min) | 0% TEA Rel. % | 0% TEA size (micron) | 2% TEA Rel. % | 2% TEA size (µm) |
|---|---|---|---|---|
| 0 | 31% | 2.4 | 62% | 6.6 |
| 1 | 18% | 2.0 | 32% | 3.2 |
| 2 | 12% | 1.9 | 24% | 3.2 |
| 3 | 9.1% | 1.9 | 18% | 3.2 |
| 4 | 6.7% | 1.9 | 15% | 3.2 |
| 5 | 4.7% | 1.9 | 13% | 3.2 |
| 6 | 3.4% | 1.9 | 11% | 3.2 |
| 7 | 1.9% | 1.9 | 0.0% | - |
| 8 | 1.1% | 1.9 | | |
| 9 | 0.4% | 1.9 | | |
| 10 | 0% | | | |

FIGURE 12

TABLE 13

Example Ink 13 - Zoidine XL-295E

| Time (min) | 0% TEA | | 2% TEA | |
|---|---|---|---|---|
| | Rel. % | size (μm) | Rel. % | size (μm) |
| 0 | 16% | 1.1 | 16% | 1.1 |
| 1 | 15% | 1.1 | 14% | 1.1 |
| 2 | 14% | 1.1 | 13% | 1.1 |
| 3 | 14% | 1.1 | 13% | 1.1 |
| 4 | 13% | 1.1 | 12% | 1.1 |
| 5 | 13% | 1.1 | 12% | 1.1 |
| 10 | 11% | 1.1 | 11% | 1.1 |
| 15 | 10% | 1.1 | 9.8% | 1.1 |
| 30 | 8.9% | 1.1 | 7.6% | 1.1 |
| 45 | 8.8% | 1.1 | 5.9% | 1.1 |
| 60 | 8.8% | 1.1 | 4.5% | 1.1 |
| 90 | 8.7% | 1.1 | 4.4% | 1.1 |
| | Stopped | | Stopped | |

Example Ink 7 - Crosslinker CX-100

| Time (min) | 0% TEA | | | 2% TEA | |
|---|---|---|---|---|---|
| | Rel. % P1 (240 nm) | Rel. % P2 (1.5 μm) | Rel. % P3 (12 μm) | Rel. % | size (μm) |
| 0 | 14% | 66% | 17% | 26% | 1.0 |
| 1 | 12% | 59% | 30% | 22.3% | 1.0 |
| 2 | 29% | 55% | 17% | 21.5% | 1.0 |
| 3 | 29% | 53% | 19% | 21.4% | 1.0 |
| 4 | 29% | 53% | 19% | 20.6% | 1.0 |
| 5 | 30% | 52% | 20% | 19.3% | 1.0 |
| 10 | 32% | 51% | 19% | 18.6% | 1.0 |
| 15 | 35% | 50% | 17% | 18.6% | 1.0 |
| 20 | 37% | 50% | 15% | 18.4% | 1.0 |
| 25 | 38% | 50% | 12% | 18.1% | 1.0 |
| 30 | 41% | 48% | 13% | 17.9% | 1.0 |
| 60 | 45% | 55% | - | 12.3% | 1.0 |
| | Stopped | | | Stopped | |

FIGURE 13

TABLE 14

| composition of ink | | Example inks | | | | | | | | |
|---|---|---|---|---|---|---|---|---|---|---|
| | | 29 | 30 | 31 | 32 | 33 | 34 | 35 | 36 | 37 |
| Pigment dispersion | Kodak Specialty Black A1 | 12.00 | 12.00 | 12.00 | 12.00 | 12.00 | 12.00 | 12.00 | 12.00 | 12.00 |
| Resin | Joncryl 683 - 20% | 10.00 | | | | | | | | |
| | Joncryl 586 - 20% | | 10.00 | | | | | | | |
| | Joncryl HPD 296 - 20% | | | 10.00 | | | | | | |
| | Joncryl 671 - 20% | | | | 10.00 | | | | | |
| | Joncryl 678 - 20% | | | | | 10.00 | | | | |
| | Joncryl 682 - 20% | | | | | | 10.00 | | | |
| | Polyacrylic acid - 20% | | | | | | | 10.00 | | |
| | Joncryl 819 - 20% | | | | | | | | 10.00 | |
| | Joncryl 820 - 20% | | | | | | | | | 10.00 |
| Base | Ammonium Hydroxide | 0.096 | 0.298 | | 0.095 | 0.095 | 0.048 | 0.073 | 0.102 | 0.037 |
| Humectant | Glycerol | | | | | | | | | |
| | 2-Pyrrolidone | 6.00 | 6.00 | 6.00 | 6.00 | 6.00 | 6.00 | 6.00 | 6.00 | 6.00 |
| | ethylene glycol | 12.00 | 12.00 | 12.00 | 12.00 | 12.00 | 12.00 | 12.00 | 12.00 | 12.00 |
| Surfactant | Surfynol 440 | 0.30 | 0.30 | 0.30 | 0.30 | 0.30 | 0.30 | 0.30 | 0.30 | 0.30 |
| | Capstone FS-31 | 0.30 | 0.30 | 0.30 | 0.30 | 0.30 | 0.30 | 0.30 | 0.30 | 0.30 |
| Biocide | Proxel GXL | 0.20 | 0.20 | 0.20 | 0.20 | 0.20 | 0.20 | 0.20 | 0.20 | 0.20 |
| Crosslinker | Epocros WS-700 | 3.03 | 1.98 | 2.59 | 3.93 | 3.95 | 4.37 | 17.13 | 1.38 | 1.38 |
| Water | RODI water | 56.07 | 56.92 | 56.61 | 55.18 | 55.16 | 54.78 | 41.99 | 57.72 | 57.78 |

FIGURE 14

TABLE 15

| | Example Ink | Resin | Acid # | Tg | Molecular Weight | Dry rub rating | Water rub rating | Window cleaner rub rating | Isopropyl alcohol rub rating |
|---|---|---|---|---|---|---|---|---|---|
| Low Acid # | 29 | Joncryl 683 | 165 | 75 | 8000 | ■ | ■ | □ | □ |
| | 30 | Joncryl 586 | 108 | 60 | 4300 | ■ | ■ | ■ | □ |
| | 36 | Joncryl 819 | 75 | 57 | 15000 | ■ | ■ | ■ | ■ |
| | 37 | Joncryl 820 | 75 | 57 | 15000 | ■ | ■ | ■ | ■ |
| | 31 | Joncryl HPD 296 | 141 | 15 | 11500 | ■ | ■ | ■ | □ |
| Medium Acid # | 32 | Joncryl 671 | 214 | 128 | 17000 | ■ | ■ | ■ | □ |
| | 33 | Joncryl 678 | 215 | 85 | 8500 | ■ | ■ | □ | ● |
| | 34 | Joncryl 682 | 238 | 56 | 1700 | ■ | ■ | ○ | □ |
| High Acid # | 35 | Polyacrylic acid | 933 | 106 | 1800 | ■ | ■ | × | ■ |

Rub Durability Rating

| × | ○ | ● | □ | ■ |
|---|---|---|---|---|
| poor | fair | good | very good | excellent |
| <2 | 2 to 3.99 | 4 to 5.99 | 6 to 7.99 | >8 |

FIGURE 15

TABLE 16

| composition of ink | | 38 | 39 | 40 | 41 | 42 | 43 | 44 | 45 | 46 | 47 | 48 | 49 |
|---|---|---|---|---|---|---|---|---|---|---|---|---|---|
| | | | | | | Example inks | | | | | | | |
| Resin | Joncryl 683 (KOH) 20% Sol. | 10.00 | 10.00 | 10.00 | 10.00 | 10.00 | 10.00 | 10.00 | 10.00 | 10.00 | 10.00 | 10.00 | 10.00 |
| Humectant | Glycerol | 6.00 | 6.00 | 6.00 | 6.00 | 6.00 | 6.00 | 6.00 | 6.00 | 6.00 | 6.00 | 6.00 | 6.00 |
| | 2-Pyrrolidone | 12.00 | 12.00 | 12.00 | 12.00 | 12.00 | 12.00 | 12.00 | 12.00 | 12.00 | 12.00 | 12.00 | 12.00 |
| Surfactant | Surfynol 440 | 0.30 | 0.30 | 0.30 | 0.30 | 0.30 | 0.30 | 0.30 | 0.30 | 0.30 | 0.30 | 0.30 | 0.30 |
| | Capstone FS-31 | 0.30 | 0.30 | 0.30 | 0.30 | 0.30 | 0.30 | 0.30 | 0.30 | 0.30 | 0.30 | 0.30 | 0.30 |
| Biocide | Proxel GXL | 0.20 | 0.20 | 0.20 | 0.20 | 0.20 | 0.20 | 0.20 | 0.20 | 0.20 | 0.20 | 0.20 | 0.20 |
| Crosslinker | Primid XL-552 | | 13.35 | | | | | | | | | | |
| | Epocros WS-700 | | | 17.82 | | | | | | | | | |
| | Cymel 303 LF | | | | 3.35 | | | | | | | | |
| | Carbodilite V-02-L2 | | | | | 19.47 | | | | | | | |
| | Carbodilite V-04 | | | | | | 16.94 | | | | | | |
| | Denacol EX-321 | | | | | | | 2.82 | | | | | |
| | Adipic Dihydrazide | | | | | | | | 3.53 | | | | |
| | Crosslinker CX-100 | | | | | | | | | 3.35 | | | |
| | EMTech CL-100 | | | | | | | | | | 6.47 | | |
| | Ammonium Zirconium (IV) Carbonate sol. | | | | | | | | | | | 1.00 | |
| | Tyzor LA | | | | | | | | | | | | 0.35 |
| Water | RODI water | 71.20 | 57.85 | 53.38 | 67.85 | 51.73 | 54.26 | 68.38 | 67.67 | 67.85 | 64.73 | 70.20 | 70.85 |

FIGURE 16

TABLE 17

| Example Ink | Crosslinker | Ink Keeping Stability: Change in Viscosity (cP) after 8 Weeks at 60°C | | |
| --- | --- | --- | --- | --- |
| | | 0% TEA | 0.5% TEA | 2% TEA |
| 38 | None | 0.01 | 0.00 | -0.01 |
| 39 | Primid XL-552 | 0.04 | 0.04 | 0.07 |
| 40 | Epocros WS-700 | -0.01 | -0.02 | -0.07 |
| 41 | Cymel 303 LF | 0.03 | 0.17 | 0.35 |
| 42 | Carbodolite V-03-L2 | 0.03 | 0.13 | 0.34 |
| 43 | Carbodolite V-04 | Gelled | Gelled | Gelled |
| 44 | Denacol EX-321 | -0.03 | -0.09 | -0.02 |
| 45 | Adipic Dihydrazide | 0.01 | 0.12 | 0.18 |
| 46 | Crosslinker CX-100 | 0.02 | 0.12 | 0.24 |
| 47 | EMTech CL-100 | 0.02 | 0.02 | 0.05 |
| 48 | Ammonium Zirconium (IV) Carbonate sol. | 0.11 | -0.27 | -0.40 |
| 49 | Tyzor LA | 0.14 | 0.13 | 0.14 |

FIGURE 17

TABLE 18

| Example Ink | 3 Day Ambient Keeping 1:1 Crosslinker:Resin (No Pigment) | |
| --- | --- | --- |
| | Crosslinker | Particle Size (μm) |
| 38 | None | 0 |
| 39 | Primid XL-552 | 184 |
| 40 | Epocros WS-700 | 176 |
| 41 | Cymel 303 LF | 150 |
| 42 | Carbodolite V-02-L2 | 182 |
| 43 | Carbodolite V-04 | 3 |
| 44 | Denacol EX-321 | 160 |
| 45 | Adipic Dihydrazide | 0 |
| 46 | Crosslinker CX 100 | 4 |
| 47 | EMTech CL-100 | 44 |
| 48 | Ammonium Zirconium (IV) Carbonate sol. | 159 |
| 49 | Tyzor LA | 178 |

FIGURE 18

TABLE 19

| | composition of ink | Example Inks | | | | | | | | | |
|---|---|---|---|---|---|---|---|---|---|---|---|
| | | 50 | 51 | 52 | 53 | 54 | 55 | 56 | 57 | 58 | 59 |
| Pigment dispersion | Kodak Specialty Black A1 | 12.0 | 12.0 | 12.0 | 12.0 | 12.0 | 12.0 | 12.0 | 12.0 | 12.0 | 12.0 |
| Resin | Joncryl 683 (NH4OH Salt) 20% Sol. | 10.0 | 10.0 | 10.0 | | | | | | | 10.0 |
| | *Final NH4OH % in Ink (14% aq. w/w%) | (0.73%) | (0.73%) | (0.73%) | | | | | | | (0.73%) |
| | Joncryl 683 (TEA Salt) 20% Sol. | | | | 10.0 | 10.0 | 10.0 | | | | |
| | *Final TEA % in Ink | | | | (1.87%) | (1.87%) | (1.87%) | | | | |
| | Joncryl 683 (DMEA Salt) 20% Sol. | | | | | | | 10.0 | 10.0 | 10.0 | |
| | *Final DMEA % in Ink | | | | | | | (0.51%) | (0.51%) | (0.51%) | |
| Humectant | Glycerol | 6.0 | 6.0 | 6.0 | 6.0 | 6.0 | 6.0 | 6.0 | 6.0 | 6.0 | 6.0 |
| | 2-Pyrrolidone | 12.0 | 12.00 | 12.0 | 12.0 | 12.0 | 12.0 | 12.0 | 12.0 | 12.0 | 12.0 |
| Surfactant | Surfynol 440 | 0.30 | 0.30 | 0.30 | 0.30 | 0.30 | 0.30 | 0.30 | 0.30 | 0.30 | 0.30 |
| | Capstone FS-31 | 0.30 | 0.30 | 0.30 | 0.30 | 0.30 | 0.30 | 0.30 | 0.30 | 0.30 | 0.30 |
| Biocide | Proxel GXL | 0.02 | 0.02 | 0.02 | 0.02 | 0.02 | 0.02 | 0.02 | 0.02 | 0.02 | 0.02 |
| Crosslinker | Primid XL-552 | 0.03 | 0.03 | | | | | | | | |
| | Epocros WS-700 | | | | | 0.03 | | | 0.03 | | 0.02 |
| | Cymel 303 LF | | | 0.01 | | | 0.01 | | | 0.01 | |
| Water | RODI water | 59.38 | 59.35 | 59.37 | 59.38 | 59.35 | 59.37 | 59.38 | 59.35 | 59.37 | 59.36 |

FIGURE 19

TABLE 20

| Example Ink | Crosslinker | % | temp. (°C) | Particle Size (nm) | | | Viscosity (cP) | | |
|---|---|---|---|---|---|---|---|---|---|
| | | | | Initial | 4 Weeks | 8 Weeks | Initial | 4 Weeks | 8 Weeks |
| | Joncryl 683 NH4OH Salt | | | | | | | | |
| 50 | None | - | 60 | 57 | 57 | 56 | 2.25 | 2.26 | 2.25 |
| 51 | Epocros WS-700 | 3.03% | 60 | 59 | 56 | 57 | 2.31 | 2.30 | 2.31 |
| 52 | Cymel 303 LF | 0.57% | 60 | 57 | 56 | 56 | 2.32 | 2.29 | 2.31 |
| | Joncryl 683 TEA Salt | | | | | | | | |
| 53 | None | - | 60 | 58 | 57 | 56 | 2.38 | 2.39 | 2.38 |
| 54 | Epocros WS-700 | 3.03% | 60 | 60 | 56 | 57 | 2.45 | 2.47 | 2.44 |
| 55 | Cymel 303 LF | 0.57% | 60 | 56 | 56 | 56 | 2.34 | 2.55 | 2.70 |
| | Joncryl 683 DMEA Salt | | | | | | | | |
| 56 | None | - | 60 | 57 | 57 | 60 | 2.40 | 2.43 | 2.41 |
| 57 | Epocros WS-700 | 3.03% | 60 | 60 | 56 | 56 | 2.46 | 2.54 | 2.59 |
| 58 | Cymel 303 LF | 0.57% | 60 | 57 | 56 | 57 | 2.25 | 5.67 | 7.45 |

FIGURE 20

DURABLE OUTDOOR INKJET INKS

PRIORITY INFORMATION

The present application is a continuation application of PCT Patent Application Number PCT/US2019/061898, filed on Nov. 17, 2019, and claims priority, under 35 U.S.C. § 120, from PCT Patent Application Number PCT/US2019/061898, filed on Nov. 17, 2019. The entire content of PCT Patent Application Number PCT/US2019/061898, filed on Nov. 17, 2019, is hereby incorporated by reference.

PCT Patent Application Number PCT/US2019/061898, filed on Nov. 17, 2019, claims priority, under 35 U.S.C. § 119(e), from U.S. Provisional Patent Application No. 62/768,883, filed on Nov. 17, 2018.

The present application claims priority, under 35 U.S.C. § 119(e), from U.S. Provisional Patent Application No. 62/768,883, filed on Nov. 17, 2018. The entire content of U.S. Provisional Patent Application No. 62/768,883, filed on Nov. 17, 2018, is hereby incorporated by reference.

BACKGROUND

Digital inkjet printing has been rapidly replacing analog printing of graphic images, information signage, and photographs. The transition from analog to digital started with indoor print applications but is now growing into many outdoor print applications. Aqueous inkjet inks have been widely used for such indoor print applications while solvent and UV curable inkjet inks have been used for both indoor and outdoor graphical printing due to their higher durability. In addition to the greater outdoor durability of solvent and UV curable inkjet inks, they may be printed directly on to a wide variety of outdoor durable substrates without the need for an ink receptive layer.

Pigmented aqueous inkjet inks prepared with soluble resin binders are used for printing onto a wide variety of substrates. The pigment-based colorants used in these inks are much more resistant to fade than dye-based colorants and are thus suitable for applications requiring exposure to direct sunlight.

However, because the water soluble resin binder in these inks may re-dissolve when exposed to moisture, these inks are not suitable for many outdoor display applications, especially on uncoated substrates. When Pigmented aqueous inkjet inks are printed onto outdoor durable substrates which do not have an ink receptive layer, the image substrate will exit the printer in a wet state and be easily damaged.

Aqueous, pigmented, latex inkjet ink technology began to be utilized in an effort to improve the durability of inkjet prints, see for example U.S. Pat. Nos. 6,019,828 and 6,177, 498.

The use of latex polymer particles in printing inks is well known. European Patent Number EP0068903B1 discloses the use of dye containing latex particles in inkjet ink; polymeric latex particles in inkjet inks are also disclosed in published Japanese Patent Application Number 2,867,491 and U.S. Pat. No. 5,284,894. U.S. Pat. No. 5,112,399 discloses the use of styrene-acrylate emulsions and styrene-butadiene latex in inkjet inks.

U.S. Pat. No. 5,284,894 discloses that "a volatile base, or alkaline material is required in a fortified latex to maintain the polyelectrolyte resin in solution. Preferably, this base is ammonia, because it is volatile and relatively inexpensive. The ready evaporation of ammonia favors faster drying and guarantees quick development of water resistance that most of the inks must acquire after printing. Other volatile bases include any of the lower boiling amines such as methyl amine, dimethyl amine, trimethyl amine, ethyl amine, diethyl amine, and triethyl amine. Monoethanol amine, diethanol amine, and morpholine can also be used to achieve special effects such as better redispersibility on the press or slower drying. Sodium hydroxide, potassium hydroxide, sodium carbonate and other inorganic bases may be useful for special applications. The amount of a volatile base used must be sufficient to maintain solubility and uniformity of the ink, without settling out of the resin polyelectrolyte. We have found a pH of 8.0 to 8.5 to be a preferred range.

World Patent Application Number WO1999023182A discloses latex binders as "particles" and not as solution polymers. U.S. Pat. No. 8,114,923 discloses that the term "latex" or "latex dispersion" includes both latex particulates as well as the aqueous medium in which the latex particulates are dispersed.

The term latex is widely used to refer to a dispersion or suspensions of polymer particles in a liquid medium. The use of the term latex differentiates the state of the polymer in the liquid ink. Whereas a polymer which is soluble in a liquid is considered to be in the liquid state once dissolved in the liquid, the latex polymer is clearly in the solid state as in insoluble particle suspended in a liquid.

The terms emulsion and latex are frequently interchanged. U.S. Pat. Nos. 5,990,202; 6,019,828; 6,498,202; 6,417,249; 6,858,301; 7,030,175; 7,371,273; 8,267,505; 8,268,910; 8,314,163; 8,487,036; 8,573,761; and 8,939,568 disclose the use of polymers dispersed in a liquid inkjet ink. The entire contents of U.S. Pat. Nos. 5,990,202; 6,019,828; 6,498,202; 6,417,249; 6,858,301; 7,030,175; 7,371,273; 8,267,505; 8,268,910; 8,314,163; 8,487,036; 8,573,761; and 8,939,568 are hereby incorporated by reference.

These patents use a variety of terms to describe such dispersed polymers, for example they are called latex binders, core/shell polymeric binder, polymer particles, latex particles, latex particulates, polymeric latex binder, latex dispersion, steric stabilized latex particulate, self-dispersed latex particulates, polymers dispersed in a jettable vehicle, hybrid latex, core-shell polymers and so forth. All of these the descriptions of polymer particles dispersed in a liquid inkjet ink shall be considered latex polymers for the purposes of this document.

Pigmented aqueous inkjet inks prepared with latex binders have achieved sufficient durability for many outdoor display applications. U.S. Pat. No. 7,030,175 discloses that in addition to the typical color and general image fade issues that occur in many ink-jet ink systems, ink-jet prints have also been known for poor durability when exposed to water or high humidity. This results from the use of water-soluble and water dispersible colorants within the water-based ink. In response to this problem, latex polymers that are compatible with ink jet inks have been incorporated with the inks. The latex can consist of small micron or submicron hydrophobic polymeric particles of high molecular weight that are dispersed in the aqueous ink-jet ink. When printed as part of an ink-jet ink, a latex component of the ink can form a film on a media surface after drying, entrapping, and protecting the colorant within the hydrophobic print film.

U.S. Pat. No. 6,417,249 discloses aqueous pigmented inkjet inks which utilize Core-Shell latex binders comprised of monomers which when polymerized as homopolymers form low glass transition temperature polymers. These binders improve film formation of the dried inkjet inks to help improve durability. This patent claims core-shell binders with glass transition temperatures which range from about −25 to +110 C. This patent does not disclose how the monomers in the core-shell binders are distributed between the core and the shell. However, it would be expected that those binders with good film formation properties would have lower Tg monomers concentrated in the shell as this is the portion of the latex particle which would be expected to play the largest role in particle coalescence and film formation.

The addition of elevated temperature drying capability to inkjet printers has enabled latex containing inkjet inks to be printed and dried directly onto uncoated outdoor durable substrates to form printed images with high moisture resistance. However, if the drying temperature required for such inks is too high, the process will become incompatible with many of the polymeric film substrates used for outdoor graphical printing. If the drying time is too long for such inks the productivity of the printer will be diminished. Consequently, the latex polymers used in such inks typically have low film forming temperatures to facilitate quick drying at reasonable temperatures.

It is well known by those skilled in the art that latex polymers with low glass transition temperatures (Tg) also have low film forming temperatures. Dried films of such polymers tend to be softer and more elastomeric by nature than higher Tg polymers. Latex binders with low film forming temperature coalesce quickly into softer films than higher Tg binders. The scratch and abrasion resistance of images printed with such latex containing inkjet inks can be rather poor.

U.S. Pat. No. 10,072,166 discloses that the minimum film-forming temperature (MFFT) of the latex binder in a thermal inkjet ink has to be low (<100° C.) so that the film formation after printing can be achieved easily—the lower the MFFT, the greater the ease of film formation. Consequently, it will save the energy cost of fusing of the latex particles and increase the speed of printing. The entire content of U.S. Pat. No. 10,072,166 is hereby incorporated by reference.

The outdoor durability of pigmented aqueous inkjet inks may be improved by selecting resin binders which have low water solubility in their native state but can be solubilized in high pH aqueous vehicles further improves outdoor durability. Preferably, such polymers have an acid number greater than 50 (mg KOH/g).

Resin binders which can be solubilized into basic pH aqueous vehicles have the advantage of forming films upon removal of the aqueous vehicle in the drying process. Inks containing solubilized resin binders may be dried under ambient conditions and form tough, abrasion resistant film. However, the drying process may be greatly accelerated by exposing the printed ink to heated air and/or radiant infrared or near-infrared emissions.

The outdoor durability of pigmented aqueous inkjet inks prepared with soluble polymer binders may be improved with the introduction of crosslinking agents to the ink. Crosslinking agents capable of reacting with the polymer binder after printing and drying of the ink are known by those skilled in the art, see for example U.S. Pat. No. 9,771,488. U.S. Pat. No. 9,771,488 discloses that printed ink drying methods may include, for example, "a heat source (e.g., a heat press) or heated air blown from a heat source (e.g., IR heater, a hair dryer, oven, etc.)" The entire content of U.S. Pat. No. 9,771,488 is hereby incorporated by reference. The crosslinking of water soluble polymer binders greatly reduces water solubility of such polymers by forming a 3-dimensional polymer network of very high molecular weight. Printed and dried inkjet inks comprised of crosslinked polymer networks have high resistance to water and other solvents and good scratch and abrasion resistance.

As used herein, the phrase "crosslinking agent" refers to a substance that promotes or regulates intermolecular covalent, ionic, hydrophobic or other form of bonding between polymer chains, linking them together to create a network of chains which result in a more elastic and/or rigid structure. Crosslinking agents, contain at least two reactive groups that can interact with respective groups present in the polymer binder of the ink composition.

Japanese Patent Application Number 2002121447A discloses aqueous, pigmented inkjet inks which contain water soluble binders and crosslinkers. After drying, these crosslinkers would be expected to improve the durability and water resistance of such inks when compared to similar inks without crosslinkers. However, this patent application did not test the stability of such inks when exposed to high temperatures. Inks must withstand commercial shipping temperatures which can get as high as 40° to 60° C. to have good commercial value. Under such hot conditions the inks disclosed in this patent application would be expected to be unstable.

Much work has been done on the crosslinking of inkjet inks for improved durability; see for example, U.S. Pat. No. 4,285,690. However, not much attention has been paid to the stability and raw stock keeping of such inks. The entire content of U.S. Pat. No. 4,285,690 is hereby incorporated by reference.

Crosslinking agents, which are activated during high temperature curing, have been disclosed in inkjet inks; see for example, U.S. Pat. No. 9,611,401. However, such crosslinking agents typically must be activated above 80° C., a temperature too high for many of the substrates used in outdoor durable graphics. The entire content of U.S. Pat. No. 9,611,401 is hereby incorporated by reference.

U.S. Pat. No. 9,771,488 discloses the use of crosslinking agents which react with carboxylated polymers. Examples of such crosslinking agents include carbodiimides, oxazolines, melamine-formaldehyde resins, and zirconium carbonate salts. There are two main challenges for inkjet inks containing such crosslinking agents and soluble polymer binders; ink stability and compatibility with thermal inkjet printheads. From the ink stability standpoint, the reactions of crosslinking agents and polymers are both concentration and temperature dependent. Such reactions can proceed in the liquid ink under ambient conditions, albeit at a slow rate. However, even minor reactions in the liquid ink can alter the viscosity of the ink which in turn can degrade its printing performance. To moderate such crosslinking reactions in the liquid ink, the '488 patent discloses the use of inhibitors in the liquid ink.

These inhibitors interfere with the crosslinking reaction, helping the inks to maintain a stable viscosity in the liquid state. After printing, the inhibitors may be removed from the ink as it dries, allowing the crosslinking reaction to proceed. U.S. Pat. No. 9,771,488 discloses tertiary amines as inhibition agents of the crosslinking reaction of carboxyl containing polymer binders and crosslinking agents. The entire content of U.S. Pat. No. 9,771,488 is hereby incorporated by reference.

From an inkjet printhead standpoint, the crosslinkers disclosed in U.S. Pat. No. 9,771,488 are not compatible with thermal inkjet printheads, even with the tertiary amine stabilizers included in the ink. Use of such inks in thermal inkjet printers quickly degrades the thermal printhead's ability to eject ink from the head. Additionally, tertiary amine stabilizers added to inkjet inks may actually catalyze the crosslinking reaction between carboxylated polymer binders and crosslinking agents.

Not wishing to be bound to any particular theory, it is believed that when inks containing such crosslinkers come in contact with the heating elements of thermal print heads, an insoluble material forms in the ink and is deposited on the inner surfaces of the printhead, reducing the volume on ink accessible to the heaters and interfering with heat flow from the heaters into the ink.

For inkjet inks printed, using inkjet printers utilizing piezo type printheads, the interference of crosslinking agents which can react with carboxylated polymers is much diminished. However, it remains critical that inkjet inks, containing reactive crosslinkers and binders have adequate ink stability.

U.S. Pat. No. 6,639,006 discloses the use of poly-nucleophilic functionalized compounds as crosslinkers for inkjet inks containing water-dissipatable precursors(s) for acrylic-polymers. The inkjet inks of U.S. Pat. No. 6,639,006 preferably comprise dyes as the colorants due to their greater stability and lower loading requirements. U.S. Pat. No. 6,639,006 preferably calls out a thermal inkjet printing process but does not preclude the use of piezo and other non-thermal printing processes.

Indeed, U.S. Pat. No. 6,639,006 acknowledges that the thermal inkjet printing process may be more onerous on the precursor than other non-thermal inkjet printing processes. In fact, U.S. Pat. No. 6,639,006 states that the disclosed inks have a low tendency to block the nozzles of thermal ink jet printers, indicating that there is still some tendency of these inks to block printhead nozzles. U.S. Pat. No. 6,639,006 discloses polymeric precursor(s) with acid numbers preferably in the range of 100 to 1000 mg KOH/g. U.S. Pat. No. 6,639,006 also acknowledges that water dissipatable polymers are known to work poorly in thermal inkjet printers. Indeed, those skilled in the art will understand that as the acid value of a polymer increases, the polymer becomes more hydrophilic and the viscosity of the aqueous based vehicle in which they are dissolved will become higher. For compatibility with anionically stabilized pigment dispersions, such acid polymers much be neutralized. As the acid number of such polymers is increase, the concentration of ions used to neutralize the polymer also increases in the ink vehicle, interfering with thermal ink jettability. The entire content of U.S. Pat. No. 6,639,006 is hereby incorporated by reference.

From a printer compatibility standpoint many disclosures endorse the compatibility of inks comprised of low acid number polymers. U.S. Pat. No. 10,005,876 discloses that inkjet ink comprising polymeric binders of low acid number (10 mg/g to about 50 mg/g) are believed to improve the decap performance and print reliability of the inkjet ink. However, as the acid number is reduced, it is difficult to dissolve such polymers in a basic pH aqueous vehicle. In fact, the polymers described in this the '876 patent are dispersions rather than solution polymers. As noted earlier in this document, inkjet ink containing latex or dispersion type resins must be dried at temperatures sufficient to cause the latex or dispersed polymer to form into a film. Latex or dispersed polymers with low film formation temperatures often suffer from low durability, particularly resistance to scratching and abrasion. Latex or dispersed polymers with high film formation temperatures provide greater durability but the film formation temperatures are too high for use on some outdoor durable substrates. The entire content of U.S. Pat. No. 10,005,876 is hereby incorporated by reference.

U.S. Pat. No. 7,838,574 discloses acrylic polymers with low acid numbers in the range of 130 to 200 mg KOH/g. The entire content of U.S. Pat. No. 7,838,574 is hereby incorporated by reference.

European Patent Number 2,341,110 discloses that it is preferable that the carboxyl group-containing polyurethane obtained in this manner have an acid value of 20 to 70 mg KOH/g since the ejection stability of the prepared aqueous ink for inkjet recording is favorable. European Patent Number 2,341,110 discloses that the aqueous polymer prepared from the carboxyl group-containing polyurethane that is used forms an aqueous dispersion. The particle size of the aqueous dispersion is preferably less than 50 nm. When the particle size is 50 nm or larger, dispersion stability of the aqueous dispersion becomes unsatisfactory, and the carboxyl group-containing polyurethane may be precipitated from the ink to cause kogation when ink is discharged for a long time. The entire content of European Patent Number 2,341,110 is hereby incorporated by reference.

U.S. Pat. No. 8,198,391 discloses the ejection stability of an aqueous ink for ink jet is superior when the acid value of the carboxyl group-containing polyurethane binder of the ink is from 20 to 70 mg KOH/g. U.S. Pat. No. 8,198,391 discloses that the aqueous polymer prepared from the carboxyl group-containing polyurethane that is used in the present invention forms an aqueous dispersion. The entire content of U.S. Pat. No. 8,198,391 is hereby incorporated by reference.

U.S. Pat. No. 8,474,963 discloses that with polyurethane and polystyrene acrylate polymeric binders with acid values above of more than 100 mg KOH/g are used in inkjet inks, problems occur such as the viscosity of the ink becoming excessively high, lowering ejection performance. The resins described in U.S. Pat. No. 8,474,963 are dispersed in the ink vehicle and not dissolved. The entire content of U.S. Pat. No. 8,474,963 is hereby incorporated by reference.

Published United States Patent Application Number 2007/0259989 discloses the use of β-hydroxyalky amide yl crosslinkers and acidic resin binders in aqueous, pigmented inkjet inks. The ratio of the number of equivalents of hydroxyl of the β-hydroxyalky amide yl to the number of equivalents of acid groups and acid salts of the polymeric binder and polymeric dispersant in the ink was generally from about 1/0.01 to about 1/1. An excess of equivalents of hydroxyl to the equivalents of carboxyl and salt from the binder and dispersant was preferred.

Such high levels of crosslinker are not compatible with thermal printheads, causing a reduction in jetting efficiency as the ink is printed through the printhead. Additionally, such high levels of crosslinker greatly reduce ink stability.

Indeed, Published United States Patent Application Number 2007/0259989 discloses that the stability of the inks were tested by heating them to 70° C. for 7 days and if key properties such as particle size of the pigment dispersion and ink viscosity did not change by more than 20%, the inks were considered to be stable. The examples tested for stability did indeed change in viscosity and pigment particle size after being subjected to such storage conditions and such changes in these properties were realized. Changes in such physical properties by 20% or less can be detrimental to the printing performance of such inks. The entire content of Published United States Patent Application Number 2007/0259989 is hereby incorporated by reference.

Thus, it is desirable to provide a pigmented, aqueous inkjet ink which when inkjet printed and dried on various substrates forms an outdoor durable image that improves low scratch and abrasion resistance of latex based inkjets inks as well as improves ink stability and inkjet printhead compatibility of crosslinker containing inks.

BRIEF DESCRIPTION OF THE DRAWINGS

The drawings are only for purposes of illustrating various embodiments and are not to be construed as limiting, wherein:

FIGS. 1 and 2 illustrate tables of example inks;

FIGS. 3 through 5 illustrate tables showing rub resistance of some of the example inks of FIGS. 1 and 2;

FIG. 6 illustrates a table showing resistance to dry rub of some of the example inks of FIG. 1;

FIG. 7 illustrates a table showing resistance to water rub of some of the example inks of FIG. 1;

FIG. 8 illustrates a table showing resistance to window cleaner rub of some of the example inks of FIG. 1;

FIG. 9 illustrates a table showing resistance to isopropyl alcohol rub of some of the example inks of FIG. 1;

FIGS. 10 and 11 illustrate tables showing ink keeping stability of the example inks of FIG. 1;

FIGS. 12 and 13 illustrate tables showing particle size distribution of the example inks of FIG. 1;

FIG. 14 illustrates a table of example inks;

FIG. 15 illustrates a table showing rub resistance of the example inks of FIG. 14;

FIG. 16 illustrates a table of example inks;

FIG. 17 illustrate a table showing ink keeping stability of the example inks of FIG. 16;

FIG. 18 illustrates a table showing particle size of the example inks of FIG. 16;

FIG. 19 illustrates a table of example inks; and

FIG. 20 illustrates a table showing particle size and viscosity stability of the example inks of FIG. 19.

DETAILED DESCRIPTION

The following is a detailed description of aqueous, pigmented inkjet inks comprising water soluble polymeric binders and crosslinking agents and having excellent ink stability at elevated temperatures and can be inkjet printed and dried onto uncoated substrates to form water and abrasion resistant images.

Polymers may include any carboxyl-group containing polymer that reacts with the water stabilized electrophilic cross-linking agents disclosed herein. The reactivity of electrophilic crosslinking agents to carboxylated polymers is sensitive to the concentration of water in the ink. As water is removed from the ink in the drying process, the concentration of crosslinking agent relative to the carboxylated polymer increases, shifting the equilibrium toward the cross-linking reaction.

Conversely, as the ink is diluted with water the equilibrium shifts towards less interaction between the polymer and crosslinking agent. Unexpectedly, the impact of this chemical reaction equilibrium has been observed in the particle size distribution (PSD) of the pigment dispersions in these inks, especially in highly reactive electrophilic crosslinking agents.

Without subscribing to any particular theory, the reaction between the electrophilic crosslinking agent and the carboxyl-group containing polymer in the ink creates a macro-molecule which destabilizes the pigment dispersion, causing an aggregation of pigment particles.

Inks absent the electrophilic crosslinker have a mono-modal PSD. Depending upon electrophilic crosslinker reactivity, concentration in the ink, and the temperature of the ink, when such crosslinkers are introduced into inkjet inks containing carboxyl-group containing polymers and pigment dispersions, a bi-modal or tri-modal PSD of pigment particles develops, with peaks at the original PSD of the pigment dispersion and at larger PSD's. The larger PSD modes are observed to regress towards the original PSD as the ink is diluted with water.

Inkjet polymers may include, but are not limited to, a styrene-acrylic copolymer, a styrene-methacrylic acid copolymer, a maleic resin, a maleic anhydride-modified polymer, a carboxylated polyurethane, a carboxylated styrene-buta-diene block copolymer, a carboxylated styrene-butadiene-styrene block copolymer, a carboxylated styrene-isoprene-styrene block copolymer, a carboxylated polyolefin, and combinations thereof.

Examples of commercially available polymers include, but are not limited to Bondthane™ series from Bond Polymers, NeoRez™ and NeoCryl™ series from Royal DSM N.V., Luciden™ series from Hydrite Chemical Company, Plextol™ R 123 from Synthomer, Dispertex™ series from Diamond, Takelac™ series from Mitsui Chemicals America, Inc., AC and U series from Alberdingk Boley, Inc., R series from Essential Polymers, Texicryl™ series from Scott Bader, Ltd., Appretan™ series from Clariant, Hycar®, Hystretch®, Permax®, and Sancure® series from Lubrizol Corporation, Encor® series from Arkema, Inc., Arolon® series from Reichhold, RUCO-COAT®, RUCO-PUR®, and RUCO-BOND® series from Rudolf-Duraner, Witcobond® series from LANXESS, Joncryl® (available from BASF), ISOBAM® (available from Kuraray Co., Ltd), SUPER-CHLON® (available from Nippon Paper Chemicals), Auro-ren® (available from Nippon Paper Chemicals), Erkamar® (available from Robert Kraemer GmbH & Co. KG), SMA® (available from Cray Valley USA LLC), XIRAN® (available from Polyscope Polymers B.V.), WorleeSin® (available from Worlee-Chemie GmbH), CRAYVALLAC® (available from Cray Valley USA LLC), MICHEM® (available from Michelman), SBLatex® (available from Asahi Kasei Chemicals), HITEX® (available from Hansol Chemical), RL® (available from RLA Polymers PTY LTD), UNI-BOND® (available from Unichem, Inc.), Hybridur® (available from Air Products), Alberdingk® (available from Alberdingk Boley), Bayhydrol® (available from Bayer Material Science), Ecrylic® (available from Ecronova Polymer), Acropol® (available from Kros Link), Jonrez® (available from Meadwestvaco), Liocryl® (available from Synthopol), WorleeCryl® (available from Worlee), Cydrothane® (available from Cytec), Hauthane® (available from Hauthaway), Urotuf® (available from Reichhold), Picassian® (available from Picassian Polymers), and Incorez® (available from Incorez Ltd). In some embodiments, the polymer may function as a dispersant for the pigment.

In some embodiments, the amount of polymer (by weight) in the inkjet ink may be between about 0.1% and about 2.0%.

Water-soluble polymeric binders may be any of those soluble in an aqueous solution in which an amine or base has been dissolved. It may preferably be those having a weight average molecular weight ranging from 1,000 to 200,000, and more preferably from 3,000 to 50,000. It may also be used in combination of two or more kinds. It may specifically include polymers, acrylic copolymers, styrene/acrylic acid copolymer, a styrene/acrylic acid/alkyl acrylate copolymer, a styrene/maleic acid copolymer, a styrene/maleic acid/alkyl acrylate copolymer, a styrene/methacrylic acid copolymer, a styrene/methacrylic acid/alkyl acrylate copolymer, a styrene/α-methylstyrene/acrylic acid copolymer, a styrene/α-methylstyrene/acrylic acid/alkyl acrylate copolymer, a styrene/maleic acid half ester copolymer, a vinylnaphthalene/acrylic acid copolymer and a vinylnaphthalene/maleic acid copolymer, or salts of these, and polyurethanes.

Water soluble styrene-acrylate binders have been used in inkjet inks before the development of latex inks. U.S. Pat. No. 5,172,133 disclosed the use of styrene/acrylic acid/ethyl acrylate copolymer binders in a pigmented inkjet ink composition. The entire content of U.S. Pat. No. 5,172,133 is hereby incorporated by reference.

The polystyrene-co-acrylate copolymer resin binder preferable has a glass transition temperature between 0° C. and 150° C., a molecular weight less than 20,000 and an acid number between 50 and 400 mg KOH/g.

The binder does contain carboxylic acid groups which give the polymer an anionic charge in the ink vehicle. The binder is not cationic and does not contain cationic groups. The binder forms a clear, viscous solution when dissolved into the liquid ink vehicle. When the binder is dissolved into the ink vehicle, it does not form a dispersion, latex, core-shell particle or the like.

While not wishing to be bound by any particular theory, it is believed that the polymeric binder dissolves fully into solution, forming tiny, vehicle swollen "gel-coils" of a single polymer molecule each, the size of which is estimated to be in the range of 5 to 25 nm.

The aqueous pigmented ink contains one or more water soluble copolymer binders. It is know that copolymer binders may be prepared with somewhat different copolymer compositions and/or with different average molecular weights and yet can still be considered "structurally related polymers.

By way of example, when copolymer binders are polymerized, a mixture of polymer molecules which differ slightly from one another in copolymer compositions and molecular weight (chain length) is formed, all such copolymer molecules being a part of the same population. Such homologous mixtures of molecules are normal for copolymers and should not be confused with heterologous mixtures of different but "structurally related polymers" which may be formed in separate polymerization processes and then combined together to form a mixture.

U.S. Pat. No. 9,771,488 discloses the following cross-linking agents as capable of undergoing a crosslinking reaction with carboxyl-group containing polymers: "carbodiimides reagent, a water-dispersible polymer that contains a carbodiimide group, an oxazoline reagent, a water-dispersible polymer that contains an oxazoline group, a methylated melamine-formaldehyde resin, or a zirconium carbonate salt, such as ammonium zirconium carbonate and potassium zirconium carbonate. Examples of commercially available crosslinking agents include, but are not limited to, Zirmel® (available from MEL Chemicals), Berset® (available from Bercen), Cymel® (available from Cytec), WorleeMin® (available from Worlee), Luwipal® (available from BASF), Zoldine® (available from Dow Chemical), Solucote® (from DSM NeoResins), Carbodilite™ (available from Nisshinbo Chemical Inc.), Resimene® & Maprenal® (available from INEOS), RODA Link® (from TFLUSA), Aerotex® (available from Union Ink), Epocros® (available from Nippon Shokubai Co., Ltd.), and Permutex® (available from Stahl USA Inc.)".

U.S. Pat. No. 5,172,133 discloses the use of two or more polymers as dispersants and binders for the pigment in an aqueous inkjet ink. While U.S. Pat. No. 5,172,133 does not use the term structurally related polymers, U.S. Pat. No. 5,172,133 does disclose polymers which are structurally related, for example, a styrene/acrylic acid copolymer and a styrene/acrylic acid/alkyl acrylate copolymer.

Various surfactants and dispersants useful in inkjet inks are disclosed in Published US Patent Application Number 2018/0118963. The entire content of Published US Patent Application Number 2018/0118963 is hereby incorporated by reference.

Surfactants and dispersants may be included in the aqueous pigmented ink. Surfactant can enhance the wetting of the composition or change the interaction of the ink with either the printing substrate, such as a film, or with the inkjet printhead. Various anionic, cationic, and nonionic dispersing agents can be used in conjunction with the ink various ink phases, and these may be used neat or as a water solution.

In one embodiment, the total surfactant concentration present in an amount that ranges from 0.05% to 5%, e.g., an amount ranging from 0.1% to 5%, or from 0.5% to 2%, by weight relative to the total weight of the inkjet ink composition.

Representative examples of anionic dispersants or surfactants include, but are not limited to, higher fatty acid salts, higher alkyidicarboxylates, sulfuric acid ester salts of higher alcohols, higher alkyl-sulfonates, alkylbenzenesulfonates, alkylnaphthalene sulfonates, naphthalene sulfonates (Na, K, Li, Ca, etc.), formalin polycondensates, condensates between higher fatty acids and amino acids, dialkylsulfosuccinic acid ester salts, alkylsulfosuccinates, naphthenates, alkylether carboxylates, acylated peptides, α-olefin sulfonates, N-acrylmethyl taurine, alkylether sulfonates, secondary higher alcohol ethoxysulfates, polyoxyethylene alkylphenylether sulfates, monoglycylsulfates, alkylether phosphates and alkyl phosphates, alkyl phosphonates and bisphosphonates, included hydroxylated or aminated derivatives.

For example, polymers and copolymers of styrene sulfonate salts, unsubstituted and substituted naphthalene sulfonate salts (e.g. alkyl or alkoxy substituted naphthalene derivatives), aldehyde derivatives (such as unsubstituted alkyl aldehyde derivatives including formaldehyde, acetaldehyde, propylaldehyde, and the like), maleic acid salts, and mixtures thereof may be used as the anionic dispersing aids.

Salts include, for example, Na+, Li+, K+, and substituted and unsubstituted ammonium cations. Representative examples of cationic surfactants include aliphatic amines, quaternary ammonium salts, sulfonium salts, phosphonium salts, and the like.

U.S. Pat. Nos. 5,133,803 and 5,221,334 disclose the use of acetylenic diol surfactants in aqueous, pigmented inkjet inks. The entire contents of U.S. Pat. Nos. 5,133,803 and 5,221,334 are hereby incorporated by reference.

U.S. Pat. No. 8,052,269 discloses a combination of surfactants comprising at least two of an ethoxylated nonionic fluorosurfactant, a nonionic alcohol ethoxylate surfactant, and an anionic phosphate fluorosurfactant, provided that the combination of surfactants results in a foaming half-life of the inkjet ink which is less than 100 minutes. The entire content of U.S. Pat. No. 8,052,269 is hereby incorporated by reference.

U.S. Pat. No. 6,436,180 discloses the use of alkoxylated fluorosurfactants in aqueous inkjet inks. The entire content of U.S. Pat. No. 6,436,180 is hereby incorporated by reference.

U.S. Pat. No. 9,487,666 discloses that the composition of Capstone e FS-3100 was a mixture of fluorosurfactants where x was always 6 and y was in the range of 7 to 17 as well as 25 to 35. The entire content of U.S. Pat. No. 9,487,666 is hereby incorporated by reference.

U.S. Pat. No. 5,852,075 describes the structural range of this class of fluorinated surfactants and their usage in inkjet inks. The entire content of U.S. Pat. No. 5,852,075 is hereby incorporated by reference.

U.S. Pat. Nos. 6,444,017 and 9,783,692 disclose the use of fluorosurfactants in aqueous inkjet inks. The entire contents of U.S. Pat. Nos. 6,444,017 and 9,783,692 are hereby incorporated by reference.

U.S. Pat. No. 9,783,692 describes the limited utility of Capstone e FS-3100 replacements for longer fluorocarbon chain surfactants. As disclosed by U.S. Pat. No. 9,783,692, various surfactant additives have been used previously in order to effectively wet low surface energy media and control image quality defects, such as color-to-color bleed and area fill mottle. These additives are used in an attempt to provide desired wetting properties and to perform well in a high-speed thermal or piezo printhead.

Materials that have been used include nonionic fluorosurfactants with perfluorinated chains of C8 or larger, but these materials are increasingly being replaced with short-chain analogs due to stewardship concerns (C6 or lower). One drawback of the short-chain materials is that the lower hydrophobicity typically provides poorer wetting and image quality control in inkjet printing than traditional longer-chain perfluorinated materials, and this ultimately limits the throughput of high-speed inkjet printing.

Representative examples of nonionic dispersants or surfactants that can be used in ink jet inks include fluorine derivatives, silicone derivatives, acrylic acid copolymers, polyoxyethylene alkyl ether, polyoxyethylene alkylphenyl ether, polyoxyethylene secondary alcohol ether, polyoxyethylene styrol ether, ethoxylated acetylenic diols, polyoxyethylene lanolin derivatives, ethylene oxide derivatives of alkylphenol formalin condensates, polyoxyethylene polyoxypropylene block polymers, fatty acid esters of polyoxyethylene polyoxypropylene alkylether polyoxyethylene compounds, ethylene glycol fatty acid esters of polyethylene oxide condensation type, fatty acid monoglycerides, fatty acid esters of polyglycerol, fatty acid esters of propylene glycol, cane sugar fatty acid esters, fatty acid alkanol amides, polyoxyethylene fatty acid amide es and polyoxyethylene alkylamine oxides.

The ink is comprised of an aqueous vehicle which is a mixture of water and water-soluble organic solvents. The water is preferably ion-exchanged water (deionized water).

The water-soluble organic solvent may be contained in the ink usually in an amount ranging from 3% by weight to 50% by weight, preferably from 3% by weight to 40% by weight, of the total weight of the ink. The water may be used in an amount ranging from 10% by weight to 90% by weight, and preferably from 30% by weight to 80% by weight, of the total weight of the ink.

The inks is preferable comprised of water, 2-pyrrolidone. Co-solvents are extensively used in aqueous inkjet inks to improve the solubility of various other components, to affect the rate of drying, to act as humectants to prevent ink drying in the printhead, as penetrants, buffers, and stabilizers.

The use of pyrrolidones as co-solvents in inkjet inks is well known; for example, U.S. Pat. No. 3,846,141 discloses that the jet printing ink composition is formulated to include a solubilizing agent in order to ensure that the water-soluble dye or dyes remain in solution in the aqueous vehicle. The solubilizing agent is N-methyl-Z-pyrrolidone, although a variety of other well-known equivalent solubilizing agents including, for example, fi,/3-dihydroxyethyl sulfide (Kramefax-Union Carbide), N-vinylpyrrolidone (boiling point 148° C.), substituted pyrrolidone (Solvofen HM-GAF), 4 methoxy-4-methyl-pentanone-2 and tetrahydrofurfuryl alcohol. The entire content of U.S. Pat. No. 3,846,141 is hereby incorporated by reference.

Japanese Patents JPH06668462, JP2714482 B2, JP251621862, and JP3147948B2 and U.S. Pat. Nos. 4,694, 302; 5,188,664; and 5,700,317 disclose the use of unsubstituted pyrrolidones and other co-solvents. The entire contents of U.S. Pat. Nos. 4,694,302; 5,188,664; and 5,700,317 are hereby incorporated by reference.

The liquid vehicle comprises water and at least one organic solvent present in an amount ranging from 1% to 50% relative to the total weight of the inkjet ink composition. The amount of the solvent can be varied depending on a variety of factors, including the properties of the solvent (solubility and/or dielectric constant), the type of colorant, and the desired performance of the resulting inkjet ink composition. The solvent preferable used ranges from 1% to 40% by weight based on the total weight of the inkjet ink composition, and more preferably from 1% to 30%.

Examples of suitable organic solvents include low molecular-weight glycols (such as ethylene glycol (boiling point 180° C.), diethylene glycol, triethylene glycol, tetraethylene glycol, dipropylene glycol, ethylene glycol monomethyl ether, ethylene glycol monoethyl ether, triethylene glycol monomethyl or monoethyl ether, diethylene glycol monomethyl ether, diethylene glycol monoethyl ether, diethylene glycol monobutyl ether, and tetraethylene glycol monobutyl ether); alcohols (such as ethanol, propanol, iso-propyl alcohol, n-butyl alcohol (boiling point 118° C.), sec-butyl alcohol, and tert-butyl alcohol, 2-propyn-1-ol (propargyl alcohol), 2-buten-1-ol, 3-buten-2-ol, 3-butyn-2-ol, and cyclopropanol); diols containing from about 2 to about 40 carbon atoms (such as 1,3-pentanediol, 1,4-butanediol, 1,5-pentanediol, 1,4-pentanediol, 1,6-hexanediol, 1,5-hexanediol, 2,6-hexanediol, neopentylglycol (2,2-dimethyl-1,3-propanediol), 1,3-propanediol, 1,4-butanediol, 1,5-pentanediol, 1,6-hexanediol, 1,2,6-hexanetriol, and poly(ethylene-co-propylene) glycol, as well as their reaction products with alkylene oxides, including ethylene oxides, including ethylene oxide and propylene oxide); triols containing from about 3 to about 40 carbon atoms (such as glycerine (glycerol), trimethylolethane, trimethylolpropane, 1,3,5-pentanetriol, 1,2,6-hexanetriol, and the like as well as their reaction products with alkylene oxides, including ethylene oxide, propylene oxide, and mixtures thereof); polyols (such as pentaerythritol); amide es (such as dimethyl formaldehyde and dimethyl acetamide e); ketones or ketoalcohols (such as acetone and diacetone alcohol); ethers (such as tetrahydrofuran and dioxane); lactams (such as 2-pyrrolidone, N-methyl-2-pyrrolidone, and ε-caprolactam); ureas or urea derivatives (such as di-(2-hydroxyethyl)-5,5,-dimethyl hydantoin (dantacol) and 1,3-dimethyl-2-imidazolidinone); inner salts (such as betaine); and hydroxyamide e derivatives (such as acetylethanolamine, acetylpropanolamine, propylcarboxyethanolamine, and propylcarboxy propanolamine, as well as their reaction products with alkylene oxides). Additional examples include saccharides (such as maltitol, sorbitol, gluconolactone and maltose); sulfoxide derivatives (symmetric and asymmetric) containing from about 2 to about 40 carbon atoms (such as dimethylsulfoxide, methylethylsulfoxide, and alkylphenyl sulfoxides); and sulfone derivatives (symmetric and asymmetric) containing from about 2 to about 40 carbon atoms (such as dimethylsulfone, methylethylsulfone, sulfolane (tetramethylenesulfone, a cyclic sulfone), dialkyl sulfones, alkyl phenyl sulfones, dimethylsulfone, methylethylsulfone, diethylsulfone, ethyl-propylsulfone, methylphenylsulfone, methylsulfolane, and dimethylsulfolane). The organic solvent can comprise mixtures of organic solvents.

In addition to the above components, a humectant may be optionally added to the ink in order to give an ink having the desired values of physical properties.

Various colorants useful in inkjet inks are disclosed in U.S. Pat. No. 8,287,112. The entire content of U.S. Pat. No. 8,287,112 is hereby incorporated by reference.

Colorants used in the inkjet inks may be pigments, dyes or a combination thereof.

The term "dye", as used herein, means an oleophilic colorant having a solubility of 10 mg/L or more in the dispersed phase in which it is applied and under the ambient conditions pertaining.

Pigments may be used in the inkjet ink. The inkjet ink preferably contains an organic and/or inorganic pigment as colorant. If the colorant is not a self-dispersible pigment, the inkjet ink preferably also contains a dispersant, more preferably a polymeric dispersant.

Pigments may be dispersed in the aqueous vehicle by dispersing agents, such as polymeric dispersants or surfactants. Additionally, the surface of the pigments can be modified to obtain so-called "self-dispersible" or "self-dispersing" pigments, i.e. pigments that are dispersible in the dispersion medium without dispersants.

The pigments in the aqueous inkjet inks may be black, white, cyan, magenta, yellow, red, orange, violet, blue, green, brown, mixtures thereof, and the like. The color pigment may be chosen from those disclosed by HERBST, Willy, et al. Industrial Organic Pigments, Production, Properties, and Applications. 3rd edition. Wiley-VCH, 2004. ISBN 3527305769.

Preferred pigments are C.I. Pigment Yellow 1, 3, 10, 12, 13, 14, 17, 55, 65, 73, 74, 75, 83, 93, 97, 109, 111, 120, 128, 138, 139, 150, 151, 154, 155, 180, 185 and 213. More preferably, yellow pigments are C.I. Pigment Yellow 74, 128, 139, 150 155 and 213. Preferred pigments are C.I. Pigment Red 17, 22, 23, 41, 48:1, 48:2, 49:1, 49:2, 52:1, 57:1, 81:1, 81:3, 88, 112, 122, 144, 146, 149, 169, 170, 175, 176, 184, 185, 188, 202, 206, 207, 210, 216, 221, 248, 251, 254, 255, 264, 270 and 272. Preferred pigments are C.I. Pigment Violet 1, 2, 19, 23, 32, 37, and 39. Preferred pigments are C.I. Pigment Blue 15:1, 15:2, 15:3, 15:4, 15:6, 16, 56, 61, and (bridged) aluminum phthalocyanine pigments. Preferred pigments are C.I. Pigment Orange 5, 13, 16, 34, 40, 43, 59, 66, 67, 69, 71, and 73.

Preferred pigments are C.I. Pigment Green 7 and 36. Preferred pigments are C.I. Pigment Brown 6 and 7. Suitable pigments include mixed crystals of the above particular preferred pigments. A commercially available example is Cinquasia Magenta RT-355-D from Ciba Specialty Chemicals.

Carbon black is preferred as a pigment for the black inkjet ink. Suitable black pigment materials include carbon blacks such as Pigment Black 7 (e.g. Carbon Black MA80 from MITSUBISHI CHEMICAL), REGAL® 400R, MOGUL® L, ELFTEX® 320 from CABOT Co., or Carbon Black FW18, Special Black 250, Special Black 350, Special Black 550, PRINTEX® 25, PRINTEX® 36, PRINTEX® 55, PRINTEX® 90, PRINTEX® 150T from DEGUSSA.

Additional examples of suitable pigments are disclosed in U.S. Pat. No. 5,389,133. Particular preferred pigments are C.I. Pigment White 1, 2, 3, 4, 5, 6, 7, 10, 11, 12, 14, 17, 18, 19, 21, 24, 25, 27, 28, and 32. The entire content of U.S. Pat. No. 5,389,133 is hereby incorporated by reference.

It is also possible to make mixtures of pigments in the color inkjet inks. For some applications, a neutral black inkjet ink is preferred and can be obtained, for example, by mixing a black pigment and a cyan pigment into the ink. Also non-organic pigments may be present in the color inkjet inks. Particularly preferred pigments Illustrative examples of the inorganic pigments include red iron oxide (III), cadmium red, ultramarine blue, Prussian blue, chromium oxide green, cobalt green, amber, titanium black and synthetic iron black.

Specific examples of commercially available pigment dispersions include Pro-Jet Cyan APD1000, Pro-Jet Magenta APD1000, Pro-Jet Yellow APD1000, Pro-Jet Yellow(LF) APD1000, Pro-Jet Black APD1000 from Fujifilm Imaging Colorants, Inc., Cab-O-Jet 200 black, Cab-O-Jet 250C cyan, Cab-O-Jet 260M magenta, Cab-O-Jet 265M magenta, Cab-O-Jet 270 yellow, Cab-O-Jet 300 black, Cab-O-Jet 352 black, Cab-O-Jet 400 black, Cab-O-Jet 450C cyan, Cab-O-Jet 465M magenta, Cab-O-Jet 470Y yellow, Cab-O-Jet 480V violet, Cab-O-Jet 554B blue, Cab-O-Jet 740Y yellow, from Cabot Corporation, Specialty Cyan Dispersion Type A1, Specialty Cyan Dispersion Type A1, Specialty Cyan Dispersion Type A1, Specialty Cyan Dispersion Type P1, Specialty Cyan Dispersion Type P2, Specialty Magenta Dispersion Type A1, Specialty Magenta Dispersion Type A2, Specialty Magenta Dispersion Type A3, Specialty Magenta Dispersion Type P1, Specialty Magenta Dispersion Type P3, Specialty Yellow Dispersion Type A1, Specialty Yellow Dispersion Type A2, Specialty Yellow Dispersion Type P1, Specialty Yellow Dispersion Type P2, Specialty Black Dispersion Type A1, Specialty Black Dispersion Type P2, Specialty Black Dispersion Type P4, Specialty Black Dispersion Type SD2, Specialty Black Dispersion Type SD4, Specialty Red Dispersion Type P1, Specialty Green Dispersion Type P1, Specialty Green Dispersion Type P2, Specialty Green Dispersion Type P3, Specialty Green Dispersion Type P4, Specialty Orange Dispersion Type P1, Specialty Violet Dispersion Type P1, Specialty White Dispersion Type P1, from Eastman Kodak™ Company, Mega Cyan, Mega Magenta, Mega Yellow 2, Mega Black, DU 1010 cyan, DU 1020 magenta, DU 1030 yellow, DU 1031 yellow, DU 1040 black, DU 1041 black, from E. I. du Pont de Nemours and Company Cylcojet Blue 15:3 Liquid, Cylcojet Blue 15:3 Liquid, Cylcojet Blue 15:3 Liquid, Cylcojet Blue 15:0 & 15:4 Liquid, Cylcojet Blue 60 Liquid, Cylcojet Brown 25 Liquid, Cylcojet Red 122 Liquid Blue Shade, Cylcojet Red 122 Liquid Yellow Shade, Cylcojet Black 7 Liquid, Cylcojet Violet 19 Liquid Blue Shade, Cylcojet Violet 19 Liquid Yellow Shade, Cylcojet Yellow 74 & 155 Liquid, Cylcojet Orange 34 & 43, Cylcojet White 6 Liquid, from Lever Colors, Inc., Hostajet Yellow 4G-PT VP2669, Hostajet Red D3G-PT VP 5152, Hostajet Magenta E5B-PT VP3565, Hostajet Magenta E7B-PT VP 5122, Hostajet Magenta E-PT, Hostajet Cyan BG-PT, Hostajet Green 8G-PT VP 5154, Hostajet Black O-PT, from Clariant International, Ltd.

Pigment particles in inkjet ink should be sufficiently small to permit free flow of the ink through the inkjet-printing device, especially at the ejecting nozzles. It is also desirable to use small particles for maximum color strength and to slow down sedimentation.

When measured by a laser diffraction particle sizing apparatus such as the Horiba LA-950 and the like, the volume average pigment particle size of a dispersed non-white pigment is preferably between 0.020 and 1 μm, more preferably between 0.040 and 0.200 μm and particularly preferably between 0.050 and 0.150 μm. Most preferably, the numeric average pigment particle size is no larger than 0.100 μm. For the white pigment dispersion when measured by a laser diffraction particle sizing apparatus such as the Horiba LA-950 and the like, the volume average pigment particle size of the white pigment is preferably from 50 to 500 nm, more preferably from 150 to 400 nm, and most preferably from 200 to 350 nm. Sufficient hiding power cannot be obtained when the average diameter is less than 50 nm, and the storage ability and the jet-out suitability of the ink tend to be degraded when the average diameter exceeds 500 nm.

The pigment is preferably used in the pigment dispersion used for preparing the inkjet inks in an amount of 10 to 40 wt %, preferably 12 to 30 wt % based on the total weight of the pigment dispersion. In the inkjet ink the pigment is preferably used in an amount of 0.1 to 20 wt %, preferably 0.5 to 10 wt % based on the total weight of the inkjet ink.

The ink composition optionally contain one or more other ingredients, such as, buffering/neutralizing agents, adhesion promoters, bactericides, fungicides, algicides, sequestering agents, softeners, thickeners, anti-foaming agents, anti-kogation agents, corrosion inhibitors, light stabilizers, anti-curl agents, thickeners, non-reactive agents, softeners/plasticizers, specialized dispersing agents, specialized Surface active agents, conductivity agents (ionizable materials) and/or other additives and adjuvants well-known in the relevant art.

pH adjusting agents include, inorganic and organic water soluble acids and inorganic and water soluble bases, and amphoteric compounds. Non-limiting examples include sodium hydroxide, potassium hydroxide, ammonium hydroxide, primary, secondary, and tertiary amines such as triethanolamine (TEA), triethyamine, dimethyl ethanolamine (boiling point 134° C.), 2-amino-2-methyl-1-propanol, amino acids such as tris(hydroxymethyl amino methane), hydrochloric acid, sulfuric acid, phosphoric acid, nitric acid, acetic acid, propionic acid, and the like. pH adjusting agents may also function as cosolvents in the ink vehicle Non-limiting examples of anti-foaming agents (defoamer) include BYK 024, BYK 012: BYK 31 (commercially available from Byk-Chemie), FOAMEX 810, AIREX 901, AIREX 902 (commercially available from Evonik Tego Chemie GmbH, Essen, Germany), SURFYNOL DF 37, SURFYNOL DF 210, SURFYNOL DF 75 (commercially available from Air Products Ltd.), and the like.

Inkjet inks contain Proxel GXL, a broad spectrum biocide to protect these inks from spoilage from by bacteria, yeasts, and fungi. Proxel GXL is 1,2-benzisothiazolin-3-one and is well known to those skilled in the art as an effective preservative for thermal inkjet inks, see for example U.S. Pat. No. 5,188,664.

For thermal inkjet inks, a long chain phosphate ester may be incorporated in the ink as an anti-kogation additive. U.S. Pat. No. 5,062,892 discloses kogation as a build-up of ink components on the heater (resistor) in the thermal inkjet print head and the use of phosphates to moderate the impact of such buildup. The entire content of U.S. Pat. No. 5,062,892 is hereby incorporated by reference.

Without subscribing to any particular theory, it appears that the kogation effect is due to adsorption of dye and/or decomposition products of ink on the resistor surface. The appearance and increase in adsorbed dye or decomposition products apparently reduces the volume of ink fired. The additive is believed to eliminate or reduce the adsorption process.

U.S. Pat. No. 5,062,892 further discloses that the most effective anti-kogation additives are phosphate salts; added either as dibasic (HPO4 2-) monobasic (H2 PO4-), polyphosphates such as diphosphate (P2 O7 4-), or phosphate esters.

The use of long chain phosphate esters is disclosed in European Patent Number 084804561 and U.S. Pat. No. 6,610,129. The entire content of U.S. Pat. No. 6,610,129 is hereby incorporated by reference.

U.S. Pat. No. 9,587,130 discloses the use of Oleth-3 phosphate esters in inkjet inks. The entire content of U.S. Pat. No. 9,587,130 is hereby incorporated by reference.

The inkjet ink is comprised of electrophilic crosslinking agents. Examples of electrophilic crosslinking agents include β-hydroxyalky amide yl crosslinkers and other related compounds.

U.S. Pat. No. 6,341,856 discloses several electrophilic crosslinking groups capable of reacting with active hydrogen. Such reactive groups include isocyanate; epoxy; carboxylic acid and derivatives; organometallic crosslinking agents such as the organic chelates of titanium, aluminum, zinc, zircon or chromium; and silane coupling agents. The entire content of U.S. Pat. No. 6,341,856 is hereby incorporated by reference.

European Patent 1,853,43161 discloses several electrophilic crosslinking agents including carbodiimide and polycarbodiimide, triazine and aminotriazine such as methoxymethyl melamine cross-linking agent, aziridine and polyfunctional azridine, polyacrylamide e, acetoacetoxy-functional polymeric crosslinking agent, melamine resins such as trimethoxymethylmelamine (TMMM), hexamethoxymethylmelamine (HMMM) or other modified melamine resins such as acrylated melamine, benzoguanamine, urea crosslinking resins, reactive silane. The entire content of European Patent 1,853,43161 is hereby incorporated by reference.

Deprotinated acrylic acid polymers and their salts act as neucophiles in the reaction with electrophilic crosslinking agents. Neucophilic crosslinking agents, such as hydrazides for example, have poor reactivity with such neucophilic polymers.

Examples

The following examples illustrate a number of embodiments of the present invention that are presently known. However, it is to be understood that the following are only exemplary or illustrative of the application of the principles of the present invention. Numerous modifications and alternative compositions, methods, and systems may be devised by those skilled in the art without departing from the spirit and scope of the present invention. The appended claims are intended to cover such modifications and arrangements. Thus, while the present invention has been described above with particularity, the following examples provide further detail in connection with what are presently deemed to be the acceptable embodiments.

Exemplary aqueous inkjet inks are prepared comprising aqueous ink vehicle with at least one water soluble organic solvent, a pigment dispersion, a copolymer comprising carboxylic acid groups dissolved in the vehicle wherein the carboxylic acid groups are base neutralized and a water stabilized poly-electrophilic functionalized compound capable of crosslinking the neutralized carboxylic acidic groups on the copolymer.

Some of the following examples were tested for operability in a thermal ink-jet printer, such as a HP™ Officejet Pro 8000™. 20 g of each ink was charged into an ink cartridge. The filled cartridge was then inserted into the HP™ Officejet Pro 8000™ and 60 pages were printed in blocks of solid color to clear the previous ink from the lines and printhead of the printer. With each of the exemplified inks, blocks were continuously printed until a significant loss of nozzles was noted.

Some of the following examples were tested for operability in a piezo ink-jet printer, such as an Epson Stylus C88+™. 20 g of each ink was charged into an ink cartridge. The filled cartridge was then inserted into the Epson Stylus C88+™ and multiple pages were printed. With each of the exemplified inks, blocks were continuously printed until a significant loss of nozzles was noted.

Some ink samples were measured for pH, viscosity, dynamic surface tension, static surface tension, and/or particle size. Samples were measured fresh and after aging in sealed containers for up to 6 weeks at 60° C. to assess their stability.

The rub durability performance of the following examples was assessed in order to evaluate the resistance of dried ink samples on a substrate to abrasion and chemical damage. Ink examples were drawn down onto glossy vinyl substrates (HP™ Permanent Gloss Adhesive Vinyl (J3H62A)) and dried for up to 96 hours at 60° C. The dried ink drawdowns were measured for dry rub durability as well as wet rub durability with water, a spray cleaner (Windex™ Ammonia Free by SC Johnson™) and isopropanol (100%).

Rub durability testing was conducted on the examples using a Taber™ Crockmeter. For the dry rub test, a dried ink drawdown example was placed in a Crockmeter equipped with a crock-cloth covered tip. The arm weight on the Crockmeter was measured at 1,428 g, an additional 928 g weight was place on the arm directly over the tip. The Crockmeter was turned ON and the crock-cloth tip moved in a linear motion back and forth for 100 cycles. The sample was removed and visually ranked on a scale of 0 to 10 for abrasion damage. Compared to un-rubbed samples, the rub resistance of an example was rated as excellent (■), with little or no visual damage, a ranking of 8 to 10. Examples were rated as very good (□), with slight visual damage, a ranking of 6 to 8. Examples were as good (●), with visual damage, a ranking of 4 to 6. Examples were rated as fair (○), with modest visual damage, a ranking of 2 to 4. Examples were rated as poor (x), with severe visual damage, a ranking of 0 to 2.

Wet rub durability testing was also conducted on the samples in a similar fashion. For wet water rub durability, 0.5 cc of water was placed on the sample and the crock-cloth covered tip placed in the water. The Crockmeter was then turned ON for 100 cycles.

For wet window cleaner rub durability, 0.5 cc of Windex™ was placed on the sample and the crock cloth covered tip placed in the liquid. The Crockmeter was then turned on for 30 cycles.

For wet isopropanol rub durability, 0.5 cc of isopropanol (100%) was placed on the sample and the crock-cloth covered tip placed in the liquid. The Crockmeter was then turned ON for 30 cycles.

Ink examples were measure for viscosity in the fresh state as well as after ink aging in a sealed glass container for up to 6 weeks at 60° C. Viscosity measurements were made using a Brookfield DV-E viscometer in a water bath controlled to 20° C.

Some ink examples were measured for particle size distribution (PSD) using a Horiba LA-950 V2 Laser Scattering Particle Size Distribution Analyzer. This device uses the principles of Mie and Fraunhofer scattering theory to calculate the size and distribution of particles suspended in a liquid. The measured particle size range is 0.01 to 3000 μm for LA950V2. The application of this method to pigmented aqueous inkjet inks has been developed using the flow cell method.

In this method the refractive index of the pigment dispersion contained in the ink example is entered into the instrument and the flow cell is prepared for measurement by circulating (reverse osmosis and de-ionized) RODI water through the Vortex Genie for 30 seconds to ensure that there was no residue in the apparatus. 180 mL DI water is then added to the instrument and analyzed as a blank sample.

Example inks were characterized for PSD by using a disposable micropipette to dispense sufficient ink into the 180 ml of RODI water in the Vortex Genie and flow cell until the light transmittance of the instrument dropped to 60%. This typically required about 320 μL of ink. PSD measurements are reported as 50th percentile fraction (D50) below a given particle size (μm).

Ink examples 1 to 14 are shown in Table 1 of FIG. 1 and ink examples 15 to 28 are shown in Table 2 of FIG. 2. These examples were prepared in the following fashion.

A stock solution of a carboxylated styrene-acrylate copolymer resin (Joncryl 683) in basic pH solution was prepared. The Joncryl 683 resin used had a Tg of 75° C. and an acid number of 165 mg KOH/g. First, 4 g of KOH was dissolved into 76 g of RODI water. 20 g of the solid resin was added to the basic solution and stirred under ambient conditions until fully dissolved into solution, about 12 hours.

50 g of each ink example was prepared by adding the make-up RODI water called for in each example, typically about 59 g, to a 100 cc Pyrex beaker. A magnetic stir bar was added to the beaker and the water stirred with modest agitation. To the RODI water was added the amount and type of biocide, humectant, and surfactant called for in each example. 10 g of the resin stock solution was then thoroughly mixed into the ink. The crosslinker was then added to the ink and stirred for 30 minutes. Finally, 12 g of Specialty Black A1 pigment dispersion (supplied by Eastman Kodak™ Co.) was thoroughly mixed into the ink. The ink was then filtered through a 1 micron disk filter.

Ink examples 1 to 14 of Table 1 of FIG. 1 were prepared with glycerol and 2-Pyrrolidone water miscible solvents (humectants), surfactants including Surfynol 440 (supplied by Evonik) and Capstone e FS-31 (supplied by Chempoint). Proxel GXL (supplied by Lonza) was the biocide. The following electrophilic crosslinkers were utilized: Primid XL-552 a beta hydroxy amide crosslinker supplied by Estron Chemical, Epocros WS-700 Oxazoline functionalized reactive copolymer crosslinker supplied by NIPPON SHOKUBAI CO., LTD, Cymel 303 LF highly methylated, monomeric melamine crosslinker supplied by Allnex USA Inc., Carbodolite V-02-L2 and Carbodolite V-04 Polycarbodiimide crosslinkers supplied by Nisshinbo Chemical Inc., Denacol EX-321 multifunctional type aliphatic epoxy crosslinker supplied by Nagase and Co., LTD., CX-100 polyfunctional aziridine liquid crosslinker supplied by DSM Coating Resins, LLC, EMTech CL-100 (supplied by Target Coatings, Inc.), Ammonium Zirconium (IV) Carbonate solution crosslinker supplied by Sigma-Aldrich, Tyzor LA organic titinate crosslinker supplied by Dorf Ketal Chemicals, LLC, Zoldine XL-29SE polymeric carbodiimide crosslinking agent supplied by Angus Chemical Co., Flexipol MKO-20 blocked isocyanate crosslinking agent supplied by Innovative Chemical Technologies, Inc. The following nucleophilic crosslinker was utilized: Adipic Dihydrazide (supplied by Sigma-Aldrich).

For example, example ink 3 of Table 1 of FIG. 1 was prepared by combining 12 g of Kodak™ Specialty Black A1 dispersion, 10 g of Joncryl 683 resin stock solution, 6 g of glycerol, 12 g of 2-pyrrolidone, 0.3 g of Surfynol 440, 0.3 g of Capstone FS-31, 0.2 g of Proxel GXL and 3.03 g of Epocros WS-700.

Ink examples 15 to 28 of Table 2 of FIG. 2 were prepared in an equivalent fashion to examples 1 to 14 with the exception that ethylene glycol was substituted for glycerol.

For example, example ink 17 of Table 2 of FIG. 2 was prepared by combining 12 g of Kodak™ Specialty Black A1 dispersion, 10 g of Joncryl 683 resin stock solution, 6 g of 2-pyrrolidone, 12 g of ethylene glycol, 0.3 g of Surfynol 440, 0.3 g of Capstone FS-31, 0.2 g of Proxel GXL and 3.03 g of Epocros WS-700.

As illustrated by Tables 3, 4, and 5 of FIGS. 3 through 5, respectively, the dry rub durability of Example inks 3, 4, 6, 17, 18, and 20 have been compared with control Example inks 1 and 15. Example inks 1, 3, 4, and 6 were prepared in ink vehicle 1 containing high boiling humectants which make these inks examples slower to dry, cure and develop durability. Example inks 15, 17, 18, and 20 were prepared in ink vehicle 2 containing low boiling humectants which make these inks faster to dry, cure and develop durability. As illustrated by Tables 3, 4, and 5 of FIGS. 3 through 5, respectively, control Example inks 1 and 15, each of which do not contain electrophilic crosslinkers, do not develop dry rub durability, even after 96 hours at 60° C.

For example, as illustrated by Table 3 of FIG. 3, Example ink 3, prepared in ink vehicle 1 with 3.3% of the electrophilic crosslinker Epocros WS-700 was evaluated for dry rub durability as a function of drying time at 60° C. Without any added triethanolamine (TEA), Example ink 3 was rated as Poor (x) after 24 hours drying, as Fair (o) after 48 hours drying, as Very Good (□) after 72 hours drying and as Excellent (■) after 96 hours drying.

Example inks 3 and 17 were prepared with the Epocros WS-700 crosslinker and develop good dry rub durability after 42 to 78 hours at 60° C., depending upon the ink vehicle. However, when tertiary amine stabilizers were added to these inks (0.5-2% triethanol amine), these ink never developed an excellent level of durability and were much slower to develop good levels of durability, particularly in slower drying Vehicle 1.

Example inks 4 and 18 were prepared with the Cymel 303 LF crosslinker and develop good dry rub durability after 42 to 78 hours at 60° C., depending upon the ink vehicle. However, when tertiary amine stabilizers are added to these inks (0.5-2% triethanol amine), these ink Examples only developed a fair level of durability.

Example inks 6 and 20 were prepared with the Carbodolite V-04 crosslinker and develop good dry rub durability after 42 to 78 hours at 60° C., depending upon the ink vehicle. However, when tertiary amine stabilizers were added to these inks (0.5-2% triethanol amine), these ink were slower to develop good levels of durability and in some cases never developed excellent levels of durability.

The wet and dry rub durability of Example inks 2-14 and 16-28 were good to excellent after drying for 78 hours at 60° C.

The dry and wet rub chemical durability of Example inks 2-14 are compared with control Example ink 1, as shown in Tables 6, 7, 8, and 9 of FIGS. 6 through 9, respectively. As demonstrated in Tables 6, 7, 8, and 9 of FIGS. 6 through 9, respectively, all Example inks develop fair to excellent wet rub chemical durability to water, widow cleaner, and isopropanol after drying and curing for 96 hours at 60° C.

For example, Example ink 5 was evaluated for rub durability after being drawn down onto a glossy vinyl substrate and dried for 72 hours at 60° C. Example ink 5 was rated a Good (●) for dry rub (Table 6 of FIG. 6), Very Good (□) for wet (water) rub (Table 7 of FIG. 7), Good (●) for window cleaner rub (Table 8 of FIG. 8), and Poor (x) for isopropyl alcohol rub (Table 9 of FIG. 9).

Example ink 8, containing the nucleophilic crosslinking agent adipic dihydrazide, shows the over-all lowest level of durability compared to the other electrophilic crosslinking agents.

As noted above, the wet isopropanol rub chemical durability of Example inks 2-14 are compared with control Example ink 1, as shown in Table 9 of FIG. 9. As demonstrated in Table 9, all Example inks develop fair wet rub chemical durability to isopropanol after drying and curing for 72 hours at 60° C. When tertiary amines were added to the ink, the resistance to isopropanol rubbing generally decrease, regardless of whether triethanol amine or triethyl amine were added in at the 1% level.

For example, Example ink 10 was evaluated for isopropyl alcohol rub resistance after being drawn down onto a glossy vinyl substrate and dried for 72 hours at 60° C. With no added tertiary amine, Example ink 10 was rated as Excellent (■) for isopropyl alcohol rub resistance; with 1% triethanol amine, Example ink 10 was rated as very good (□); and with 1% triethyl amine, Example ink 10 was rated as good (●).

Example inks 1-14, as shown in Table 10 of FIG. 10, were assessed for stability by measuring the change in viscosity. Freshly prepared ink examples were compared to examples aged for 6 weeks at 60° C. in sealed glass containers. The viscosity of fresh ink examples varied from 2.5 cP to 3.5 cP. Changes in viscosity over the keeping period were judged excellent if less than 0.06 cP, very good if between 0.06 and 0.15 cP, good if between 0.15 and 0.3 cP, fair if between 0.3 and 0.6 cP, and poor if greater than 0.6 cP.

For example, Example ink 4 was evaluated for changes in viscosity after conditioning the ink sample for 8 weeks at 60° C. With 0% added triethanol amine (TEA), the ink stability was rated as Excellent (<0.06 cP) as the ink increase in viscosity after conditioning by 0.03 cP; with 0.5% added TEA, the ink stability was rated as Good (0.15 to 0.30 cP) as the ink increase in viscosity after conditioning by 0.17 cP; and with 2.0% added TEA, the ink stability was rated as Fair (0.30 to 0.60 cP) as the ink increase in viscosity after conditioning by 0.35 cP.

Example inks 6, 13 and 14 gelled or solidified during the keeping period. Unexpectedly, the addition of tertiary amine stabilizers did not stabilize the example inks from crosslinking during the keeping condition. In fact, the addition of 0.5% to 2% triethanol amine to the ink examples actually degraded the ink stability of several of the examples.

Not wishing to be bound to any particular theory, tertiary amines may actually catalyze the reaction between electrophilic crosslinkers and carboxy containing polymers.

Example inks 1-14, as shown in Table 11 of FIG. 11, were assessed for stability by measuring the change in their pigment dispersion particle size. Freshly prepared ink examples were compared to examples aged for 6 weeks at 60° C. in sealed glass containers. The pigment dispersion particle size of fresh ink examples varied from 56 to 83 nm.

Increases in pigment dispersion particle size over the keeping period were judged excellent if less than 10 nm, very good if between 10 and 20 nm, good if between 20 and 50 nm, fair if between 50 and 100 nm, and poor if greater than 100 nm.

For example, Example ink 4 was measured for PSD after 8 weeks conditioning at 60° C. With 0% added triethanol amine (TEA), the ink stability was judged to be excellent (<10 nm) as the average PSD increased by 8 nm; with 0.5% TEA, the ink stability was judged to be good (20-50 nm) as the average PSD increased by 22 nm; and with 2% added TEA, the ink stability was judged to be fair (50-200 nm) as the average PSD increased by 66 nm. Examples which gelled (solidified) could not be measured for PSD change.

Example inks 6, 13 and 14 gelled or solidified during the keeping period. Unexpectedly, the addition of tertiary amine stabilizers did not stabilize the example inks from crosslinking during the keeping condition. In fact, the addition of 0.5% to 2% triethanol amine to the ink examples actually degraded the ink stability of Example inks 3 and 9.

Not wishing to be bound to any particular theory, tertiary amines may actually catalyze the reaction between electrophilic crosslinkers and carboxy containing polymers.

Example inks 9, 11 and 12, in Table 11, show significant increases in the pigment PSD with ink keeping at 60° C. for 8 weeks. In the course of making such PSD measurements it was noted that bi or tri modal particle size distribution was present. Measurements of PSD were made in a highly diluted state and it was observed that the larger particle size peaks in the distribution would revert back to the original (fresh) mono-modal PSD.

Table 12 of FIG. 12 shows PSD data as a function of time for 8 week/60° C. aged Example inks 11 and 12, with and without 2% triethanol amine added. Table 13 of FIG. 13 shows PSD data as a function of time for 8 week/60° C. aged Example inks 13 and 7, with and without 2% triethanol amine added.

For example, Table 12 shows that Example ink 11, with 0% added triethanol amine (TEA), was measured for PSD after 8 weeks conditioning at 60° C. At time 0, a large PSD peak was observed at 6.2 microns which accounted for 55% of the scattering particles in the total PSD.

In the unaged state, Example 11 had an average PSD of 72 nm (0 TEA) and 75 nm (2% TEA). After aging Example 11 ink for 8 week/60° C., 55% of the pigment dispersion aggregated into a 6.5 micron PSD mode (0% TEA) and 19% into a 3 micron PSD mode (2% TEA).

However, as shown in Table 12, the larger PSD modes de-aggregated with time back to the original (unaged) PSD. The size of the larger PSD mode and the rate of de-aggregation were both impacted by the presence of triethanol amine in Example inks 11 and 12.

Unexpectedly, the data in Tables 12 and 13 shows the impact of water stabilization on the reaction of electrophilic crosslinking agent with carboxylated polymers in the inks of this invention. In the nominal water concentration of the inks, the reactivity of some electrophilic crosslinkers is sufficiently high with carboxylated binders to form macro molecules which both increase the viscosity and aggregate the pigment dispersion upon aging at 8 week/60° C. After the 562× dilution in the cell of the particle size analyzer, the equilibrium of the aged ink shifts back to the original PSD of the Pigment dispersion due to the huge increase in water concentration.

It was observed in this example that the presence of tertiary amines does not stabilize the reaction of crosslinkers with carboxylated polymers.

Not wishing to be bound any particular theory, tertiary amines act as catalysts in the water stabilized crosslinking reaction.

This unexpected water stabilization of pigmented ink containing electrophilic crosslinkers and carboxylated polymers creates inks with long term storage stability, excellent inkjet print head compatibility, and good outdoor durability after printing and drying. Such crosslinking reactions do not require the addition of an inhibitor since the crosslinking mechanisms are equilibrium based and dependent upon the concentrations of the reactants and water.

The high water (or other protic solvent) content of the ink vehicle shifts the equilibrium of the reaction away from crosslinking reactions. After printing and drying of the ink onto media, the water (or other protic solvents) concentration is greatly reduced, thereby allowing the equilibrium to shift towards reaction of the crosslinker and carboxylated polymers, resulting in the formation of high molecular weight crosslinked resins which encapsulates and bonds the pigment particles to the surface of the substrate.

While the crosslinked groups between polymer chains in the printed and dried ink may be reversible by hydrolysis, surprisingly, it has been found that such printed and dried inks have good resistance to water.

Not wishing to be bound to any particular theory, it is believed that the hydrophobic portions of such crosslinked polymers concentrate on the surface of the printed and dried ink, creating a barrier to water penetration.

With the selection of less reactive electrophilic crosslinkers, inks may be formulated having stable viscosity and dispersion PSD, even after storage at temperatures up to 60° C. for 6 weeks. After printing and drying, water is removed from these inks, allowing the crosslinking reaction to proceed and causing the carboxylated polymers to crosslink and to develop high water resistance, thereby providing additional durability to the printed image without compromising the shelf-life of the ink.

Additionally, such electrophilic crosslinker containing inks, stabilized by water, show good compatibility with thermal inkjet print heads.

Example inks 29 to 37 are shown in Table 14 of FIG. 14. These ink examples were prepared in an equivalent fashion to Example inks 15 to 28 with the exception that the potassium hydroxide neutralized carboxylated styrene acrylate polymer, Joncryl 683, was replaced with several ammonia neutralized carboxylated polymers.

Stock solutions of each of the carboxylated copolymer resins in Example inks 29-37 were in an equivalent fashion to the stock solution prepared in Example inks 1-28 with the exception that ammonia was substituted for the potassium hydroxide added to the water to dissolve each solid resin under ambient conditions.

For each resin stock solution, the pH was 8.9. No additional ammonium hydroxide was required for Example ink 31 as the carboxylated resin was suppled in a basic solution of water and ammonia.

For example, Example ink 29 was prepared by combining 12 g of Kodak™ Specialty Black A1 dispersion, 10 g of resin stock solution (containing 2 g of Joncryl 683, 0.73 g ammonia and the balance water) with 6 g of 2-pyrrolidone, 12 g of ethylene glycol, 0.3 g of Surfynol 440, 0.3 g of Capstone FS-31, 0.2 g of Proxel GXL and 3.03 g of Epocros WS-700.

The durability assessment of Example inks 29-35 are summarized in Table 15 of FIG. 15. Rub durability testing was conducted on the example inks using a Taber Crockmeter.

For the wet (H2O) and dry rub test, a dried ink drawdown example was placed in a Crockmeter equipped with a crock-cloth covered tip. The arm weight on the Crockmeter was measured at 1,428 g; an additional 2010 g weight was place on the arm directly over the tip. The Crockmeter was turned ON, and the crock-cloth tip moved in a linear motion back and forth for 1600 cycles.

For the window cleaner rub test, the arm weight on the Crockmeter was measured at 1,428 g; an additional 920 g weight was place on the arm directly over the tip. The Crockmeter was turned ON, and the crock-cloth tip moved in a linear motion back and forth for 800 cycles.

For the isopropanol rub test, a dried ink drawdown example was placed in a Crockmeter equipped with crock-cloth covered tip. The arm weight on the Crockmeter was measured at 1,428 g; an additional 920 g weight was place on the arm directly over the tip. The Crockmeter was turned ON, and the crock-cloth tip moved in a linear motion back and forth for 1200 cycles.

Samples were removed and visually ranked on a scale of 0 to 10 for abrasion damage. Compared to un-rubbed samples, the rub resistance of an example was rated as excellent (■), with little or no visual damage, a ranking of 8 to 10. Examples were rated as very good (□), with slight visual damage, a ranking of 6 to 8. Examples were as good (●), with visual damage, a ranking of 4 to 6. Examples were rated as fair (○), with modest visual damage, a ranking of 2 to 4. Examples were rated as poor (x), with severe visual damage, a ranking of 0 to 2.

For example, Example ink 29 was evaluated for rub durability. This example was excellent for dry and water rub resistance and very good for window cleaner and isopropyl alcohol rub resistance.

The data shows that carboxylated resins of varying Tg, acid number, and molecular weight may be employed to achieve good levels of durability after printing a drying.

Example inks 38 to 49 are shown in Table 16 of FIG. 16. These ink examples were prepared in an equivalent fashion to Example inks 15 to 28.

For example, Example ink 39 was prepared by combining 10 g of Joncryl 683 stock solution with 6 g of glycerol, 12 g of 2-pyrrolidone, 0.3 g of Surfynol 440, 0.3 g of Capstone FS-31, 3 g of Proxel GXL and 13 g of Primid XL-552.

The ink stability of Example inks 38 to 49 are shown in Table 17 of FIG. 17. More specifically, Table 17 of FIG. 17 shows the stability of various electrophilic crosslinking agents with carboxyl containing polymers at an equivalency ratio of 1:1. These examples were prepared in a similar fashion to Examples 1-14 with the exception that no pigment dispersion was included. Exclusion of the pigment dispersions from these examples allowed the interaction of the crosslinker with the carboxylated resin to be studied directly using light scattering measurements. At high equivalency ratios, crosslinking reactions may be favored over water stabilization for certain crosslinkers. Under ambient conditions small particles have been observed to develop in some of these ink examples.

At high equivalent ratios of electrophilic crosslinkers with carboxylated polymers, the crosslinking reaction is favored and the resulting examples gelled or solidified in solution during the keeping period. This gelling and solidification behavior of inks during accelerated keeping at elevated temperatures was observed in Example ink 43 as shown in Table 12.

For such crosslinkers at such concentrations as found in these examples, water stabilization was not sufficient to create a stable equilibrium between the reactants. Example ink 43 used 0.2 equivalents of crosslinker for every one equivalent of carboxylated in the resin of these examples. The concentration of an individual electrophilic crosslinker must be adjusted to ensure that the water stabilization of the crosslinking reaction remains favorable for long term ink keeping stability.

Example inks 38 to 49, as shown in Table 18 of FIG. 18, were assessed for stability by measuring the change in their particle size. For example, the particle size distribution (PSD) of Example ink 39 was measured after 3 days at ambient keeping, the largest observed PSD peak has a mean particle size of 184 microns.

These ink examples were characterized for PSD by using a disposable micropipette to dispense sufficient ink into the 180 ml of RODI water in the Vortex Genie and flow cell until the light transmittance of the instrument dropped to 60%. This typically required about 3 ml of the un-pigmented ink. PSD measurements are reported as 50th percentile fraction (D50) below a given particle size ($\mu$m). Fresh samples showed no light scattering indicating at all ink components were dissolved in the ink vehicle. After 3 days of ambient keeping, particles (3-184 um) were observed to form in all but Example ink 45. Example ink 45 contains a nucleophilic crosslinker.

The equivalents of organic electrophilic crosslinkers to nucleophilic carboxylate groups in the resin is preferably less than 100%, more preferably less than 50%, most preferably less than 25%.

Example inks 50 to 59 are shown in Table 19 of FIG. 19. Example inks 50 to 58 were prepared to demonstrate that carboxylated polymers may be neutralized with a variety of bases and maintain good ink keeping stability. Example inks 50-52 were prepared with ammonium hydroxide neutralized Joncryl 683. Example inks 53-55 were prepared with tri-ethanol amine (TEA) neutralized Joncryl 683. Example inks 56-58 were prepared with dimethylethanol amine (DMEA) neutralized Joncryl 863. As a point of comparison, Example inks 1, 3, and 4 (FIG. 1) were prepared with potassium hydroxide neutralized Joncryl 683.

For example, example ink 51 was prepared by combining 10 g of an ammonium neutralized Joncryl 683 stock solution (20% solids) with 6 g of glycerol, 12 g of 2-pyrrolidone, 0.3 g of Surfynol 440, 0.3 g of Capstone FS-31, 0.02 g of Proxel GXL, and 0.13 g of Epocros WS-700.

Example inks 50 to 59, as shown in Table 20 of FIG. 20, were assessed particle size and viscosity stability.

For example, Example ink 54 was evaluated for particle size and viscosity stability. The initial average particle size was 60 nm, this decreased to 56 nm after 4 weeks and 57 after 8 weeks conditioning at 60° C. The initial viscosity of Example ink 54 was 2.45 cP. This changed to 2.47 cP after 4 weeks and 2.44 cP after 8 weeks conditioning at 60° C. Example ink 54 was judged to have excellent stability.

Example inks 50-54 and 56 had excellent viscosity stability. Example ink 55 had fair viscosity stability. Example ink 57 had very good viscosity stability, and Example ink 58 had poor viscosity stability (Table 20 of FIG. 20) after conditioning for 8 weeks at 60° C. Example inks 50-58 had excellent particle stability (Table 20 of FIG. 20) after conditioning for 8 weeks at 60° C.

Example ink 59 was prepared and charged into an Epson Stylus piezo inkjet printer and 8 full bleed pages were printed, utilizing 24 g of ink, without issue.

An ink was prepared in a similar fashion to Example ink 2 with the exception that the 12% black pigment dispersion was replaced with 9.5% of Kodak™ Specialty Cyan P2 pigment dispersion; the 2-pyrrolidone was increased from 12 to 25%; the 6% glycerol was replaced with 8% 2-methyl-1,3-propanediol and 0.6 triethanol amine; the 0.3% Capstone FS-31 was replaced with 0.32% Capstone 3100; 0.1% of Crodafos 03A anti-kogation agent was added; and the reverse osmosis deionized water was decreased to 48.98%. This ink was used in a printing process, utilizing a HP™ Officejet Pro 8000 thermal ink-jet printer, without issue.

The inkjet ink for printing outdoor durable images on a inkjet printer comprising a basic pH aqueous ink vehicle, a soluble base, at least one water soluble organic solvent with a boiling point above 200° C., a pigment dispersion, a copolymer comprising carboxylic acid groups with a glass transition temperature above 60° C. and an acid number between 50 and 400 mg KOH/g dissolved in the vehicle wherein the carboxylic acid groups are base neutralized, a poly-electrophilic functionalized compound capable of crosslinking the carboxylic acidic groups on the copolymer wherein the ratio of the poly-electrophilic groups on the functionalized compound to carboxylic acid groups on the copolymer is 1:0.5 or less on an equivalent basis, the ink maintains a stable viscosity for a minimum of 4 weeks at 60° C. and the water in the ink inhibits the crosslinking reaction until after the ink is printed and the water is substantially removed from the ink by drying.

An inkjet ink for printing images with an inkjet printer comprises a basic pH aqueous ink vehicle including water, a soluble base, and at least one water soluble organic solvent; a pigment dispersion; and a polymer including base neutralized carboxylic acid groups with a glass transition temperature between 0° C. and 150° C. and an acid number between 50 and 1000 mg KOH/g dissolved in the vehicle, wherein the carboxylic acid groups are base neutralized; a poly-electrophilic functionalized compound capable of crosslinking the neutralized carboxylic acidic groups on the polymer wherein the ratio of the poly-electrophilic groups on the functionalized compound to carboxylic acid groups on the polymer is 1:1 or less on an equivalent basis and the ink maintains a stable viscosity and pigment particle size distribution for 6 weeks at 60° C.; the water in the ink inhibiting the crosslinking reaction until after the ink is printed and the water is substantially removed from the ink by drying; the ink does not contain tertiary amines.

The polymer may be a polystyrene-co-acrylate polymer resin binder.

The poly-electrophilic functionalized compound may be a beta hydroxy amide crosslinker, an oxazoline functionalized reactive polymer crosslinker, a highly methylated, monomeric melamine crosslinker, an isocyanate crosslinker, a multifunctional type aliphatic epoxy crosslinker, a polyfunctional aziridine liquid crosslinker, a polymeric carbodiimide crosslinking agent, an organic titinate crosslinker, an organosilane crosslinker, or a glycidyl ether crosslinker.

The at least one water soluble organic solvent maybe a humectant. The inkjet ink may further comprise a surfactant, a first surfactant to modify static surface tension and a second surfactant to modify dynamic surface tension, and/or a biocide.

The soluble base may be a non-volatile base. The pH of the basic pH aqueous ink vehicle may be between 7 and 10. The soluble base may be ammonia.

The polymer may be a soluble copolymer. The polymer may not be a dispersed polymer. The polymer may not be a latex.

The poly-electrophilic functionalized compound may include at least three reactive groups. The polymer may be less than 10% of the ink by weight. The polymer may have a molecular weight less than 50,000. The acid number may be between 50 and 400.

The water soluble organic solvent may be less than 50% of the ink by weight. The water soluble organic solvent may be less than 30% of the ink by weight.

The average particle size of the pigment in the pigment dispersion may be less than a micron. The pigment dispersion may be less than 20% of the ink by weight. The pigment dispersion may be less than 10% of the ink by weight.

The viscosity may change less than 20% in 6 weeks at 60° C. The viscosity may change less than 10% in 6 weeks at 60° C. The pigment particle size distribution may change less than 200 nm in 6 weeks at 60° C. The pigment particle size distribution may change less than 50 nm in 6 weeks at 60° C.

The ratio of the poly-electrophilic groups on the functionalized compound to carboxylic acid groups on the polymer may be 0.5:1 or less on an equivalent basis. The inkjet ink may be for printing images on non-coated surfaces.

An inkjet ink for printing images with a thermal inkjet printer comprises a basic pH aqueous ink vehicle including water, a soluble base, and at least one water soluble organic solvent; a buffer; a pigment dispersion; and a polymer including base neutralized carboxylic acid groups with a glass transition temperature between 0° C. and 150° C. and an acid number between 50 and 1000 mg KOH/g dissolved in the vehicle, wherein the carboxylic acid groups are base neutralized; a poly-electrophilic functionalized compound capable of crosslinking the neutralized carboxylic acidic groups on the polymer wherein the ratio of the poly-electrophilic groups on the functionalized compound to carboxylic acid groups on the polymer is 1:1 or less on an equivalent basis and the ink maintains a stable viscosity and pigment particle size distribution for 6 weeks at 60° C.; the water in the ink inhibiting the crosslinking reaction until after the ink is printed and the water is substantially removed from the ink by drying.

The polymer may be a polystyrene-co-acrylate polymer resin binder.

The poly-electrophilic functionalized compound may be a beta hydroxy amide crosslinker, an oxazoline functionalized reactive polymer crosslinker, a highly methylated, monomeric melamine crosslinker, a multifunctional type aliphatic epoxy crosslinker, a polymeric carbodiimide crosslinking agent, an organosilane crosslinker, or a glycidyl ether crosslinker.

The at least one water soluble organic solvent maybe a humectant. The inkjet ink may further comprise a surfactant, a first surfactant to modify static surface tension and a second surfactant to modify dynamic surface tension, and/or a biocide.

The soluble base may be a non-volatile base. The pH of the basic pH aqueous ink vehicle may be between 7 and 10. The soluble base may be ammonia.

The polymer may be a soluble copolymer. The polymer may not be a dispersed polymer. The polymer may not be a latex.

The poly-electrophilic functionalized compound may include at least three reactive groups. The polymer may be less than 10% of the ink by weight. The polymer may have a molecular weight less than 50,000. The acid number may be between 50 and 400.

The water soluble organic solvent may be less than 50% of the ink by weight. The water soluble organic solvent may be less than 30% of the ink by weight.

The average particle size of the pigment in the pigment dispersion may be less than a micron. The pigment dispersion may be less than 20% of the ink by weight. The pigment dispersion may be less than 10% of the ink by weight.

The viscosity may change less than 20% in 6 weeks at 60° C. The viscosity may change less than 10% in 6 weeks at 60° C. The pigment particle size distribution may change less than 200 nm in 6 weeks at 60° C. The pigment particle size distribution may change less than 50 nm in 6 weeks at 60° C.

The ratio of the poly-electrophilic groups on the functionalized compound to carboxylic acid groups on the polymer may be 0.5:1 or less on an equivalent basis. The inkjet ink may be for printing images on non-coated surfaces.

The inkjet ink may further comprise an anti-Kogation agent.

An inkjet ink for printing durable outdoor images with an inkjet printer consists essentially of a basic pH aqueous ink vehicle including water, a soluble base, and at least one water soluble organic solvent; a static surface tension surfactant; a dynamic surface tension surfactant; a biocide; a pigment dispersion; and a polymer including base neutralized carboxylic acid groups with a glass transition temperature between 0° C. and 150° C. and an acid number between 50 and 1000 mg KOH/g dissolved in the vehicle, wherein the carboxylic acid groups are base neutralized; a poly-electrophilic functionalized compound capable of crosslinking the neutralized carboxylic acidic groups on the polymer wherein the ratio of the poly-electrophilic groups on the functionalized compound to carboxylic acid groups on the polymer is 1:1 or less on an equivalent basis and the ink maintains a stable viscosity and pigment particle size distribution for 6 weeks at 60° C.; the water in the ink inhibiting the crosslinking reaction until after the ink is printed and the water is substantially removed from the ink by drying.

The polymer may be a polystyrene-co-acrylate polymer resin binder.

The poly-electrophilic functionalized compound may be a beta hydroxy amide crosslinker, an oxazoline functionalized reactive polymer crosslinker, a highly methylated, monomeric melamine crosslinker, an isocyanate crosslinker, a multifunctional type aliphatic epoxy crosslinker, a polyfunctional aziridine liquid crosslinker, a polymeric carbodiimide crosslinking agent, an organic titinate crosslinker, an organosilane crosslinker, or a glycidyl ether crosslinker.

The at least one water soluble organic solvent maybe a humectant. The soluble base may be a non-volatile base. The pH of the basic pH aqueous ink vehicle may be between 7 and 10. The soluble base may be ammonia.

The polymer may be a soluble copolymer. The polymer may not be a dispersed polymer. The polymer may not be a latex.

The poly-electrophilic functionalized compound may include at least three reactive groups. The polymer may be less than 10% of the ink by weight. The polymer may have a molecular weight less than 50,000. The acid number may be between 50 and 400.

The water soluble organic solvent may be less than 50% of the ink by weight. The water soluble organic solvent may be less than 30% of the ink by weight.

The average particle size of the pigment in the pigment dispersion may be less than a micron. The pigment dispersion may be less than 20% of the ink by weight. The pigment dispersion may be less than 10% of the ink by weight.

The viscosity may change less than 20% in 6 weeks at 60° C. The viscosity may change less than 10% in 6 weeks at 60° C. The pigment particle size distribution may change less than 200 nm in 6 weeks at 60° C. The pigment particle size distribution may change less than 50 nm in 6 weeks at 60° C.

The ratio of the poly-electrophilic groups on the functionalized compound to carboxylic acid groups on the polymer may be 0.5:1 or less on an equivalent basis. The inkjet ink may be for printing images on non-coated surfaces.

It will be appreciated that the above-disclosed embodiments and other features and functions, or alternatives thereof, may be desirably combined into many other different combinations. Also, various presently unforeseen or unanticipated alternatives, modifications, variations, or improvements therein may be subsequently made by those skilled in the art which are also intended to be encompassed by the description above and the following claims.

What is claimed is:

1. An inkjet ink for printing images with a thermal inkjet printer comprising:
   a basic pH aqueous ink vehicle including water, a non-volatile soluble base, and at least one water soluble organic solvent;
   a buffer;
   a pigment dispersion; and
   a polymer including base neutralized carboxylic acid groups with a glass transition temperature between 0° C. and 150° C. and an acid number between 50 and 1000 mg KOH/g dissolved in the vehicle;
   a poly-electrophilic functionalized compound capable of crosslinking the neutralized carboxylic acidic groups on the polymer wherein the ratio of the poly-electrophilic groups on the functionalized compound to carboxylic acid groups on the polymer is 1:1 or less on an equivalent basis and the pigment particle size distribution changes less than 200 nm in 6 weeks at 60°;
   said water in the ink inhibiting the crosslinking reaction until after the ink is printed and said water is substantially removed from the ink by drying;
   said basic pH aqueous ink vehicle not including tertiary amines and not including a volatile soluble base.

2. The inkjet ink as claimed in claim 1, wherein said polymer is a polystyrene-co-acrylate polymer resin binder.

3. The inkjet ink as claimed in claim 1, wherein said poly-electrophilic functionalized compound is a compound selected from the group consisting of a beta hydroxy amide crosslinker, an oxazoline functionalized reactive polymer crosslinker, a highly methylated, monomeric melamine crosslinker, an isocyanate crosslinker, an organic titinate crosslinker, an organosilane crosslinker, a glycidyl ether crosslinker, a multifunctional type aliphatic epoxy crosslinker, a polyfunctional aziridine liquid crosslinker, or a polymeric carbodiimide crosslinking agent.

4. The inkjet ink as claimed in claim 1, wherein at least one water soluble organic solvent is a humectant.

5. The inkjet ink as claimed in claim 1, further comprising a surfactant.

6. The inkjet ink as claimed in claim 1, further comprising a biocide.

7. The inkjet ink as claimed in claim 1, wherein the pH of said basic pH aqueous ink vehicle is between 7 and 10.

8. The inkjet ink as claimed in claim 1, wherein said polymer is a soluble copolymer.

9. The inkjet ink as claimed in claim 1, wherein said polymer is not a dispersed polymer.

10. The inkjet ink as claimed in claim 1, wherein said polymer is not a latex.

11. The inkjet ink as claimed in claim 1, wherein said poly-electrophilic functionalized compound includes at least three reactive groups.

12. The inkjet ink as claimed in claim 1, wherein said polymer is less than 10% of the ink by weight.

13. The inkjet ink as claimed in claim 1, wherein said polymer has a molecular weight less than 50,000.

14. The inkjet ink as claimed in claim 1, wherein said acid number is between 50 and 400.

15. The inkjet ink as claimed in claim 1, wherein said water soluble organic solvent is less than 50% of the ink by weight.

16. The inkjet ink as claimed in claim 1, wherein said water soluble organic solvent is less than 30% of the ink by weight.

17. The inkjet ink as claimed in claim 1, wherein an average particle size of a pigment in said pigment dispersion is less than a micron.

18. The inkjet ink as claimed in claim 1, wherein said pigment dispersion is less than 20% of the ink by weight.

19. The inkjet ink as claimed in claim 1, wherein said pigment dispersion is less than 10% of the ink by weight.

20. The inkjet ink as claimed in claim 1, wherein the viscosity changes less than 20% in 6 weeks at 60° C.

21. The inkjet ink as claimed in claim 1, wherein the pigment particle size distribution changes less than 50 nm in 6 weeks at 60° C.

22. The inkjet ink as claimed in claim 1, wherein the ratio of the poly-electrophilic groups on the functionalized compound to carboxylic acid groups on the polymer is 0.5:1 or less on an equivalent basis.

23. The inkjet in as claimed in claim 1, wherein the inkjet ink is for printing images on non-coated surfaces.

24. The inkjet ink as claimed in claim 1, wherein the viscosity changes less than 10% in 6 weeks at 60° C.

25. The inkjet ink as claimed in claim 1, further comprising an anti-Kogation agent.

* * * * *